United States Patent
Anderson et al.

(10) Patent No.: US 11,352,524 B2
(45) Date of Patent: Jun. 7, 2022

(54) METHODS OF BONDING SUBSTRATES TOGETHER

(71) Applicant: 3M INNOVATIVE PROPERTIES COMPANY, St. Paul, MN (US)

(72) Inventors: Cyrus A. Anderson, Bellingham, WA (US); Thomas Q. Chastek, St. Paul, MN (US); Xiao Gao, Woodbury, MN (US); Kathleen S. Shafer, Woodbury, MN (US); Sheng Ye, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/154,466

(22) Filed: Jan. 21, 2021

(65) Prior Publication Data
US 2021/0139741 A1    May 13, 2021

Related U.S. Application Data

(63) Continuation of application No. 15/576,407, filed as application No. PCT/US2016/035170 on Jun. 1, 2016, now Pat. No. 10,927,276.
(Continued)

(51) Int. Cl.
*B32B 7/12* (2006.01)
*C09J 5/00* (2006.01)
(Continued)

(52) U.S. Cl.
CPC ............... *C09J 5/00* (2013.01); *B32B 7/12* (2013.01); *B32B 17/10* (2013.01);
(Continued)

(58) Field of Classification Search
CPC ............... C09J 2463/00; C09J 2431/00; C09J 2301/416; C09J 163/00; C09J 5/00;
(Continued)

(56) References Cited

U.S. PATENT DOCUMENTS

| 4,717,605 A | 1/1988 | Urban |
| 5,131,967 A | 7/1992 | Tweadey, II |

(Continued)

FOREIGN PATENT DOCUMENTS

| CN | 101791963 | 8/2010 |
| CN | 102952503 | 11/2015 |

(Continued)

OTHER PUBLICATIONS

Epoxy Resins, Encyclopedia of Polymer Science and Engineering, vol. 6, 1986, pp. 322-382.
(Continued)

*Primary Examiner* — Daniel McNally
(74) *Attorney, Agent, or Firm* — Carlos M. Téllez Rodriguez; 3M Innovative Properties Company

(57) ABSTRACT

Methods of bonding together substrates that do not require use of primers, mixing, fixturing, or autoclaving. These methods can include the steps of disposing an adhesive layer on a bonding surface of either substrate, the adhesive layer comprising a curable composition that is dimensionally stable at ambient conditions; either before or after disposing the adhesive layer on the bonding surface, irradiating the adhesive layer with ultraviolet radiation to initiate curing of the curable composition; placing one substrate so as to be bonded to the other substrate by the adhesive layer; and allowing the adhesive layer to cure.

17 Claims, 4 Drawing Sheets

Related U.S. Application Data

(60) Provisional application No. 62/171,032, filed on Jun. 4, 2015.

(51) Int. Cl.
| | | |
|---|---|---|
| *C09J 163/00* | (2006.01) | |
| *B32B 17/10* | (2006.01) | |
| *C08L 71/00* | (2006.01) | |
| *B32B 37/12* | (2006.01) | |
| *C09J 131/04* | (2006.01) | |
| *C09J 167/00* | (2006.01) | |

(52) U.S. Cl.
CPC .. *B32B 17/10005* (2021.01); *B32B 17/10293* (2013.01); *B32B 37/12* (2013.01); *C08L 71/00* (2013.01); *C09J 131/04* (2013.01); *C09J 163/00* (2013.01); *C09J 167/00* (2013.01); *B32B 2037/1253* (2013.01); *B32B 2605/006* (2013.01); *C09J 2301/416* (2020.08); *C09J 2400/143* (2013.01); *C09J 2431/00* (2013.01); *C09J 2463/00* (2013.01); *C09J 2467/00* (2013.01)

(58) Field of Classification Search
CPC ...... B32B 2605/006; B32B 2037/1253; B32B 37/12; B32B 7/12
See application file for complete search history.

(56) References Cited

U.S. PATENT DOCUMENTS

| | | | |
|---|---|---|---|
| 5,587,236 A | 12/1996 | Agrawal | |
| 5,721,289 A | 2/1998 | Karim | |
| 5,804,610 A | 9/1998 | Hamer | |
| 6,057,382 A * | 5/2000 | Karim | C08L 63/00 |
| | | | 522/122 |
| 6,090,236 A | 7/2000 | Nohr | |
| 6,254,954 B1 | 7/2001 | Bennett | |
| 6,274,643 B1 | 8/2001 | Karim | |
| 6,284,360 B1 | 9/2001 | Johnson | |
| 6,348,118 B1 | 2/2002 | Johnson | |
| 8,506,751 B2 | 8/2013 | Wong | |
| 8,506,752 B2 | 8/2013 | Vandal | |
| 9,540,550 B2 | 1/2017 | Wu et al. | |
| 2002/0113217 A1 | 8/2002 | Herold | |
| 2002/0182955 A1 | 12/2002 | Weglewski | |
| 2011/0288242 A1 | 11/2011 | Brémont | |
| 2012/0059127 A1 * | 3/2012 | Ha | C08G 18/718 |
| | | | 525/327.2 |
| 2013/0149531 A1 | 6/2013 | Kosai | |
| 2013/0298469 A1 | 11/2013 | Recker | |
| 2013/0306813 A1 | 11/2013 | Vandal | |
| 2014/0037952 A1 | 2/2014 | Shigetomi | |
| 2014/0248498 A1 | 9/2014 | Kobayashi et al. | |
| 2014/0256842 A1 | 9/2014 | Kobayashi et al. | |
| 2015/0044479 A1 | 2/2015 | Motohashi et al. | |

FOREIGN PATENT DOCUMENTS

| | | |
|---|---|---|
| CN | 104762050 | 8/2017 |
| DE | 10360826 | 7/2005 |
| DE | 102012018630 | 3/2014 |
| EP | 0620259 | 10/1994 |
| EP | 1026218 | 8/2000 |
| EP | 2511356 | 10/2012 |
| JP | 2007171375 | 5/2007 |
| JP | 2012236992 | 12/2012 |
| WO | WO 92/20754 | 11/1992 |
| WO | WO 2013-067963 | 5/2013 |
| WO | WO 2013/077080 | 5/2013 |
| WO | WO 2013-101693 | 7/2013 |
| WO | WO 2014/028024 | 2/2014 |
| WO | WO 2015-048012 | 4/2015 |
| WO | WO 2016-195970 | 12/2016 |
| WO | WO 2017-117163 | 7/2017 |

OTHER PUBLICATIONS

International Search Report for PCT International Application No. PCT/US2016/035170, dated Aug. 8, 2016, 5 pages.

* cited by examiner

METHODS OF BONDING SUBSTRATES TOGETHER

FIELD OF THE INVENTION

The present invention is directed to methods of adhering structures together, more particularly to methods of adhering together structures (e.g., hardware to vehicular and/or architectural), hereafter vehicular/architectural, (e.g., glass) surfaces, and even more particularly to methods of adhering hardware (e.g., brackets) to vehicular glass surfaces such as, e.g., automotive windshields.

BACKGROUND

The glass windshield of a modern automobile serves many functions. One is to protect an occupant of the automobile from wind and airborne debris. Another is to impart strength to the structure of the vehicle. There is also the use of a windshield as a substrate for an assortment of attachable devices, including mirrors and sensors. New technologies have resulted in these devices becoming more numerous and sophisticated over time. These automotive devices can include rain sensors, multifunction cameras, collision avoidance sensors, and lane departure cameras.

To accommodate these devices, automobile manufacturers (i.e., original equipment manufacturers or "OEMs") have sought to consolidate device functions to save space and minimize visual obstructions to the driver and other occupants. A common solution is to mount these devices to a large bracket that is bonded to the upper central portion of the windshield. The added size of, and weight carried by, these brackets have introduced new technical challenges to permanently adhering such hardware to the glass substrate.

Conventionally, the bonding of brackets to glass occurs simultaneously with the windshield manufacturing process. In fabricating an automobile windshield, a thin polymer support layer, such as polyvinyl butyral (PVB), is sandwiched between two layers of tempered glass. These layers are then fused to each other using an autoclave process (i.e., a special oven that uses heat and pressure) to activate the PVB layer to bond the glass layers together. The same autoclaving process has been used to attach brackets to the glass surface using a heat curable adhesive. These adhesives generally require a certain autoclaving temperature, pressure, and time profile to achieve the required final bond strength. To minimize costs, many windshields are loaded into a single autoclave and the process executed as a batch.

The larger brackets used in modern automobiles, however, can pose a manufacturing difficulty. Because of their size, they require a much larger spacing between windshields within the autoclave. Since fewer windshields can fit into each autoclave, efficiency is reduced, resulting in a wasted energy, reduced throughput and ultimately, increased costs.

As a solution to the above problem, manufacturers have explored alternative bonding solutions that allow brackets to be bonded after autoclaving. These solutions, however, present their own technical challenges with respect to initial bond strength and/or required curing time. For example, conventional liquid adhesives often require a mixing and use of a primer to bond to glass. Many adhesives, based on moisture-cured or two-part curable polyurethanes, also lack the immediate green strength needed to prevent the bonded hardware from slipping along the windshield during curing. As a result, it can be necessary to clamp or tape the hardware to the glass while it cures, which is a cumbersome practice.

Alternative adhesive solutions, such as those described in U.S. Pat. No. 8,506,751 (Vandal et al.) require refrigeration of the bonding adhesive prior to its application to the hardware. Yet, the need for refrigerated storage of the adhesive again complicates the process flow and incurs additional costs.

SUMMARY

While these issues are being described in an automotive context, they may also have relevance in other vehicular markets. Adjacent vehicular markets could include, for example, aircraft and marine applications.

Methods of bonding hardware to glass, according to the present invention, can overcome the aforementioned difficulties (e.g., not requiring the use of primers, mixing, fixturing, or autoclaving), and the process flow resulting from the present invention can alleviate major pain points confronted by windshield and other glass manufacturers. Therefore, the present invention can be seen as being directed to a more efficient process for mounting hardware and devices to the surface of a glass substrate.

In a first aspect of the present invention, a method of bonding hardware to vehicular glass is provided, where the method comprises: providing the vehicular glass comprising a first sheet of glass (preferably tempered glass), a polymeric backing, and a second sheet of glass (preferably tempered glass), laminated in that order via an autoclaving process; disposing an adhesive layer on a bonding surface of either the hardware or the vehicular glass, the adhesive layer comprising a curable composition that is dimensionally stable at ambient conditions; either before or after disposing the adhesive layer on the bonding surface, irradiating the adhesive layer with ultraviolet radiation to initiate curing of the curable composition; placing the hardware so as to be bonded to the vehicular glass by the adhesive layer; and allowing the adhesive layer to cure.

In a second aspect of the present invention, a method of bonding hardware to vehicular glass provided, where the method comprises: disposing an adhesive layer on a bonding surface of either the hardware or the vehicular glass, the adhesive layer comprising a curable composition comprised of: a) in the range of from about 25 to about 80 parts by weight of one or more epoxy resins, b) in the range of from about 5 to about 30 parts by weight of one or more liquid polyether polyols, c) in the range of from about 10 to about 50 parts by weight of one or more hydroxyl-functional film-forming polymers and precursors thereof, wherein the sum of a) to c) is 100 parts per weight, and d) in the range of from about 0.1 to about 5 parts by weight of a photoinitiator, relative to the 100 parts of a) to c); either before or after disposing the adhesive layer on the bonding surface, irradiating the adhesive layer with ultraviolet radiation to initiate curing of the curable composition; placing the hardware so as to be bonded to the vehicular glass by the adhesive layer; and allowing the adhesive layer to cure.

In a third aspect of the present invention, a method of bonding hardware to vehicular glass is provided, comprising: disposing an adhesive layer on a bonding surface of either the hardware or the vehicular glass, the adhesive layer comprising a curable composition comprised of: a) in the range of from about 1 to about 50 parts by weight of one or more resins selected from (meth)acrylate resins; b) in the range of from about 12 to about 40 parts by weight of one or more hydroxyl-functional film-forming polymers or precursors thereof; c) in the range of from about 20 to about 75 parts by weight of one or more epoxy resins; d) in the range of from about 10 to about 30 parts by weight of one or more polyether polyols, wherein the sum of a) to d) is 100 parts by weight; e) in the range of from about 0.1 to about 5 parts by weight of a photoinitiator, relative to the 100 parts of a) to d); either before or after disposing the adhesive layer on the bonding surface, irradiating the adhesive layer with ultraviolet radiation to initiate curing of the curable composition; contacting the adhesive layer to the vehicular/architectural glass; and allowing the adhesive layer to cure.

In a fourth aspect, a method of bonding hardware to vehicular glass comprising: disposing an adhesive layer on a bonding surface of either the hardware or the vehicular glass, the adhesive layer comprising a curable composition comprised of: a) in the range of from about 15 to about 50 parts by weight of a semi-crystalline polyester resin; b) in the range of from about 20 to about 75 parts by weight of one or more epoxy resins; c) in the range of from about 5 to about 15 parts by weight of one or more liquid polyether polyols; d) in the range of from about 5 to about 20 parts by weight of one or more hydroxyl-functional film-forming polymers and precursors thereof, wherein the sum of a) to d) is 100 parts by weight; and e) in the range of from about 0.1 to about 5 parts by weight of a photoinitiator, relative to the 100 parts of a) to d); either before or after disposing the adhesive layer on the bonding surface, irradiating the adhesive layer with ultraviolet radiation to initiate curing of the curable composition, wherein the photoinitiator has an ultraviolet absorption curve characterized by a highest wavelength absorption peak measured at a concentration of about 0.03 wt % in acetonitrile solution and wherein the ultraviolet radiation has a spectral power distribution offset (e.g., positively) from the wavelength of the highest wavelength absorption peak; placing the hardware so as to be bonded to the vehicular glass by the adhesive layer; and allowing the adhesive layer to cure.

In a fifth aspect, a method of bonding hardware to vehicular glass is provided, comprising: disposing an adhesive layer on a bonding surface of either the hardware or the vehicular glass, the adhesive layer comprising a photoinitiator having an ultraviolet absorption curve characterized by a highest wavelength absorption peak measured at a concentration of about 0.03 wt % in acetonitrile solution; either before or after disposing the adhesive layer on the bonding surface, irradiating the adhesive layer with ultraviolet radiation to initiate curing of the curable composition, wherein the ultraviolet radiation has a spectral power distribution offset (e.g., positively) from the wavelength of the highest wavelength absorption peak; contacting the adhesive layer to the vehicular glass; and allowing the adhesive layer to cure.

Figure 1:
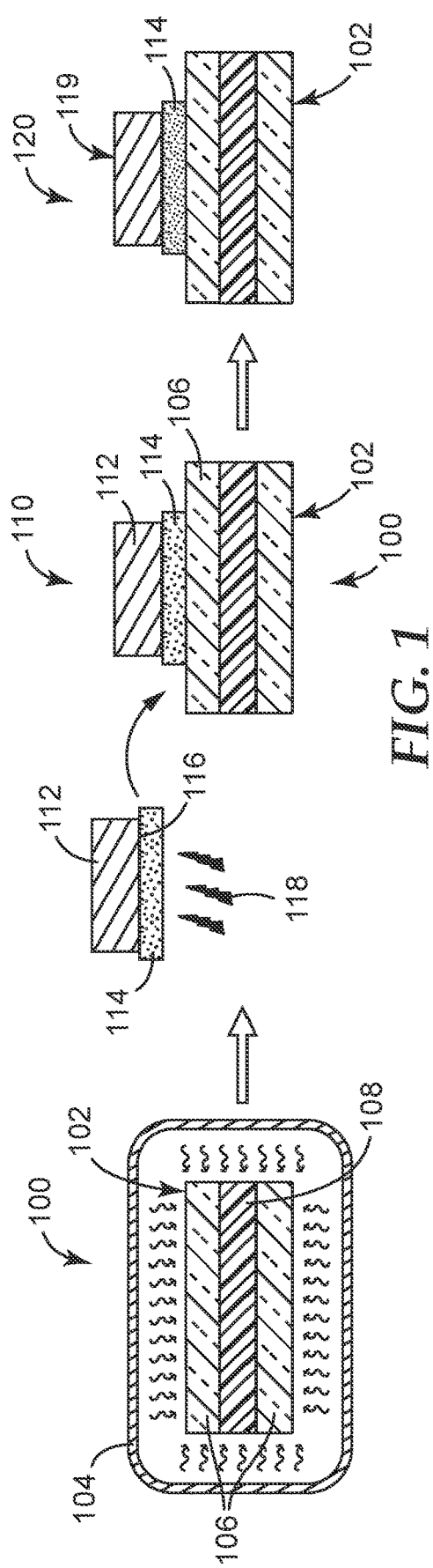
FIGS. 1-4 are schematics showing methods of adhering hardware to glass according to various exemplary embodiments.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. Figures may not be drawn to scale.

Definitions

As used herein:
"ambient conditions" means at a temperature of 25° C. and pressure of 1 atm (101 kilopascals);
"cure" refers to the process of crosslinking monomers and/or oligomers into a covalently bonded network;
"cured" means a given material is sufficiently crosslinked to allow for its immediate use in its intended application;
"polyol" means a compound having a hydroxyl functionality of two or more; and "semi-crystalline" means having at least some crystalline domains.

DETAILED DESCRIPTION

Described herein, by way of illustration and example, are improved methods of bonding hardware to vehicular glass. The hardware, in exemplary embodiments, can include, but not be limited to, buttons and brackets for mounting various structures such as, for example, side and rear view mirrors, rain sensors, temperature sensors, etc. Vehicular glass, in exemplary embodiments, can include, but are not limited to, windshields and other windows (e.g., skylights, side-facing windows, and rear-facing windows) used in automobiles, trucks, trains, motorcycles, aircraft and water vessels (e.g., boats and ships). The present invention may also be useful with architectural glass or other applications where something (e.g., hardware) is to be bonded to glass. In exemplary embodiments, the architectural glass can include windows in residential or commercial buildings such as homes, apartments, office buildings, restaurants, manufacturing facilities Preferred methods are described herein and directed to autoclaved automotive windshields, but these methods are not intended to necessarily be so limited. Some or all of the provided methods are well suited for bonding to other types of vehicular glass, or glass substrates more generally.

In useful embodiments, the hardware represents a bracket having an external surface adapted for bonding to the curved, interior surface of a glass windshield. Such brackets may include large format brackets capable of accommodating multiple accessories such as rain sensors, multifunction cameras, collision avoidance sensors, lane departure cameras, or even one or more peripheral brackets. Additional brackets may include those adapted for bonding to tempered glass found in side- and rear-windows of a vehicle.

Alternatively, the hardware could represent a mirror button for attaching a rear view mirror, along with any of its related accessories.

Bonding Methods

FIG. 1 illustrates an exemplary method of bonding hardware to an automotive windshield according to one exemplary embodiment. The steps shown merely exemplify the provided methods and need not be exhaustive. Moreover, one or more additional steps may be inserted prior to, after, or between the steps shown in FIG. 1 (and variant FIGS. 2-4) according to the knowledge and skill of a professional practicing in this area.

The first step, herein designated by the numeral 100, represents the autoclaving of a layered construction to obtain an automotive windshield of laminated glass, a type of safety glass that holds together when it is shattered.

Autoclaving is a process by which an article is subjected to highly pressurized hot air or steam. In step 100, a layered construction 102 is received in an autoclave 104, which operates to laminate the layers of the layered construction 102 to each other. As shown in FIG. 1, the layered construction includes a pair of tempered glass layers 106, 106 disposed on both major surfaces of a polymeric interlayer 108. Tempered glass is a glass that is processed by controlled thermal or chemical treatments to increase its strength compared with normal glass. Tempering operates by putting the outward-facing surfaces into compression and the inward-facing surfaces into tension.

The polymeric interlayer 108 is typically made from a tough, flexible polymer such as polyvinyl butyral ("PVB") or ethylene-vinyl acetate ("EVA").

The high temperature and pressure provided by the autoclave 104 permanently laminates the layers 106, 108, 106 together to provide the laminated glass.

Referring again to FIG. 1, step 110 shows the process of placing a bracket 112 having a pre-applied adhesive layer 114 to be bonded onto the now-laminated layered construction 102. As shown, this is a two-step process.

First, the adhesive layer 114 is irradiated with actinic radiation, such as ultraviolet ("UV") radiation 118, to initiate a curing reaction in the adhesive layer 114. As shown, the UV radiation 118 is directed through the adhesive layer 114 and onto the underlying bonding surface 116 of the bracket 112. As an alternative, the UV radiation 118 can be transmitted through the bracket itself if the bracket is made from a material translucent to the curing radiation.

Second, as shown in the second part of step 110, the bracket 112 and adhesive layer 114 are collectively mounted onto the autoclaved layered construction 102 to form a bonded assembly 119. In the bonded assembly 119, the adhesive layer 114 directly contacts one of the glass layers 106.

The adhesive layer 114 is preferably a die-cut adhesive layer. Optionally, the die-cut adhesive layer can be tailored to match the footprint of the bonding surfaces of the bracket 112 such that the adhesive layer 114 does not extend beyond the peripheral edges of the bracket 112. If desired, two or more die-cut adhesive layers may be disposed side-to-side on the bonding surfaces.

The adhesive layer 114 contains a mixture of monomers/oligomers and a suitable photoinitiator that can be activated by UV radiation to polymerize the monomer components.

Various UV light sources can be used for this purpose.

One type of UV source is a relatively low light intensity source such as a black light which provides generally 10 mW/cm$^2$ or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 nm to 400 nm.

A second, higher light intensity UV source is a broad spectrum mercury lamp, which can provide intensities generally greater than 10 mW/cm$^2$, and preferably between 15 and 3000 mW/cm$^2$. For example, an intensity of 600 mW/cm$^2$ and an exposure time of about 1 second may be used successfully. Intensities can range from 0.1 mW/cm$^2$ to 6000 mW/cm$^2$ and preferably from 0.5 mW/cm$^2$ to 3000 mW/cm$^2$.

A third type of light source is a light emitting diode ("LED") UV source. LED-based UV sources are advantageous because they are capable of generating UV light over a much narrower wavelength range compared with black lights and mercury lamps.

In step 120, the composition of the adhesive layer 114 in the bonded assembly 119 is allowed to cure (or crosslink) over time. Advantageously, the adhesive layer 114 has sufficient tack and dimensional stability to eliminate the necessity of clamping or using any other type of mechanism to secure the bracket 112 to the glass layer 106 as the curing reaction proceeds.

The irradiation of the adhesive layer 114 in step 110 is preferably sufficient to achieve a functional cure of the adhesive layer 114 under ambient conditions. As an option, however, the time required to reach a functional cure can be accelerated with heat, typically by baking the bonded assembly 119 in an oven for a pre-determined period of time.

The post-cure bake for an onium salt type photoinitiator can last for at least 2 minutes, at least 3 minutes, or at least 5 minutes. On the upper end, the post-cure bake may be sustained up to 35 minutes, up to 25 minutes, or up to 15 minutes. The temperature of the post-cure bake can be, for example, at least 35° C., at least 70° C., or at least 90° C. The temperature can be at most 180° C., at most 150° C., or at most 120° C.

Figure 2:
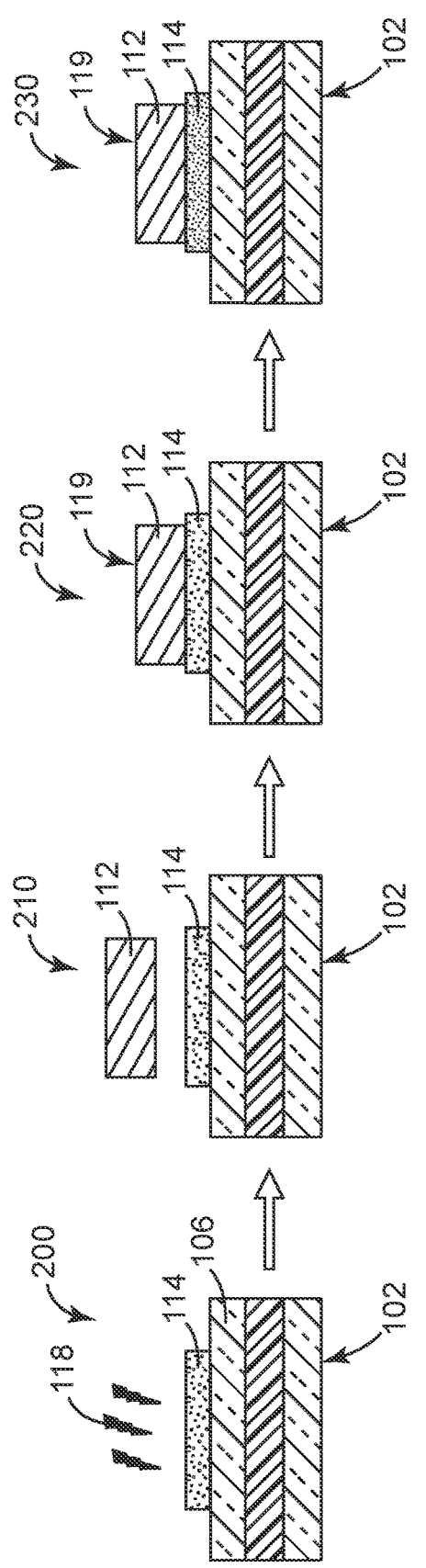
Figure 3:
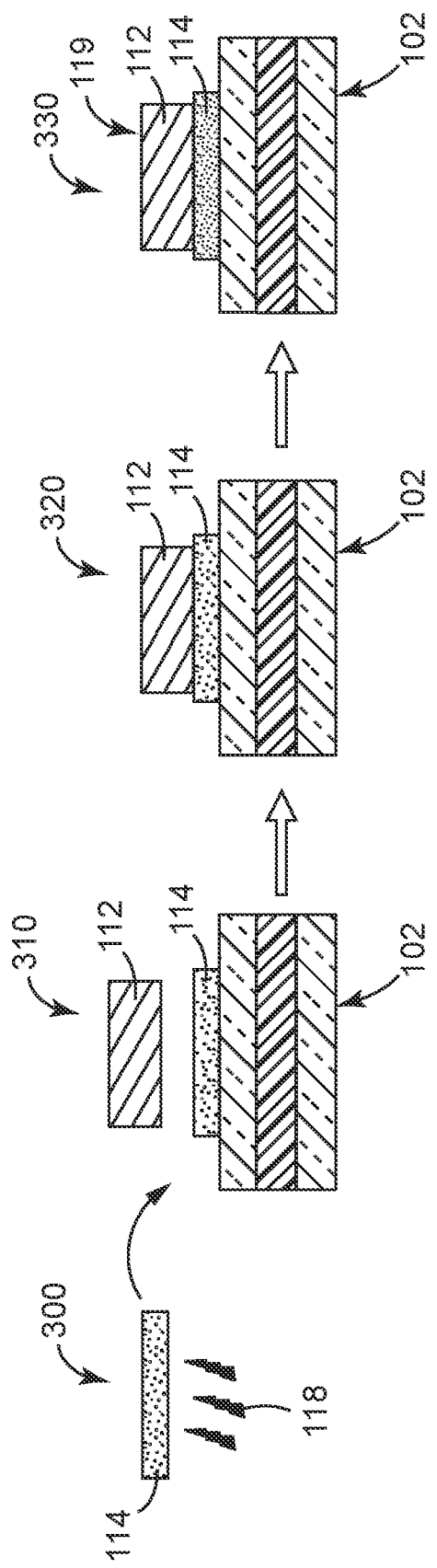
Figure 4:
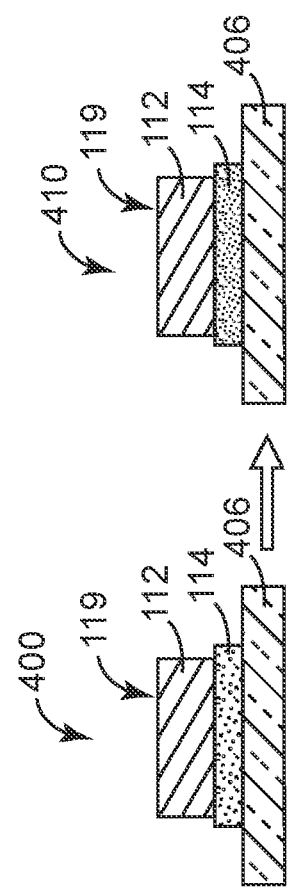

Each of FIGS. 2-4 shows a variation on the aforementioned method of bonding. Differences are pointed out below, but those aspects of each method not expressly defined below can be substantially similar to those described with respect to the method of bonding shown in FIG. 1.

FIG. 2 illustrates an alternative to steps 110, 120 in the bonding of the same bracket 112 to the same autoclaved laminated glass. First, in step 200, the adhesive layer 114 is placed in contact with the glass layer 106 at the outset and then irradiated with the UV radiation 118 to initiate curing of the adhesive. Then, in step 210, the bracket 112 is placed into contact with the adhesive layer 114 to provide the bonded assembly 119 shown in step 220. Finally, in step 230, the adhesive layer 114 of the bonded assembly 119 is allowed to cure over time.

FIG. 3 illustrates another alternative to steps 110, 120 of FIG. 1. In step 300 of this variant, the adhesive layer 114 is irradiated using the UV light 118 as a stand-alone layer, as shown. Optionally but not shown, the adhesive layer 114 could be provided on a release liner that is removed before or after irradiation. In step 310, the adhesive layer 114 is then placed in contact with the bracket 112 and layered construction 102, adhering them to each other to provide the bonded assembly 119 shown in step 330. Finally, the adhesive layer 114 of the bonded assembly 119 is allowed to cure over time as shown in step 330.

FIG. 4 independently shows another method of bonding to glass. In step 400, the bracket 112 is adhered onto a glass layer 406 using the adhesive layer 114 to form the bonded assembly 119. The bonded assembly 119 is then irradiated with the UV light 118 to initiate curing of the adhesive layer 114. In a subsequent step 410, the adhesive layer 114 is allowed to cure over time.

Adhesive Compostions

The adhesive layer can be made from any of a number of useful UV-activated adhesives. Preferred adhesives include structural bonding adhesives having high strength and adhesion properties.

UV-activated adhesives do not require heat for curing, although as mentioned above, heat can be used to accelerate the curing process after activation. The structural bonding adhesive is useful for bonding hardware to glass, but can also be effective in bonding together one or more substrates generally.

In preferred embodiments, the adhesive is prepared using a hot melt process, thereby avoiding the need for volatile solvents. Use of these solvents is often undesirable because of costs associated with procurement, handling and disposal of these components.

Useful components in the adhesive layer used for bonding hardware to glass are enumerated and described under the subheadings below.

Tetrahydrofurfuryl (Meth)Acrylate Copolymers

In certain embodiments, the adhesive comprises a tetrahydrofurfuryl (THF) (meth)acrylate copolymer component. Unless otherwise specified, the THF acrylates and methacrylates will be abbreviated as THFA. More particularly, it comprises a copolymer of tetrahydrofurfuryl (meth)acrylate, a $C_1$-$C_8$ (meth)acrylate ester and an optional cationically reactive functional (meth)acrylate.

The copolymer further comprises a $C_1$-$C_8$ alkyl (meth) acrylate ester monomer. Useful monomers include the acrylates and methacrylate of methyl, ethyl, propyl, isopropyl, butyl, pentyl, hexyl, heptyl and octyl alcohols, including all isomers, and mixtures thereof. It is preferred that the alcohol is selected from $C_3$-$C_6$ alkanols, and in certain embodiments, the carbon number molar average of the alkanols is $C_3$-$C_6$. It has been found that within this range the copolymer has sufficient miscibility with the epoxy resin component and it allows for formulation of a UVi SBT with a useful overall balance of adhesive properties, including overlap shear adhesion.

The carbon number molar average may be calculated by summing the number of moles of each alkanol ($C_1$-$C_8$ alkanols) multiplied by the carbon number of each alkanol, and dividing the result by the total number of moles of alkanols: i.e., $$\Sigma_{\alpha-\omega}[(\text{Moles of alkanol})\times(\text{\# carbon atoms for alkanol})]/\text{\# moles of alkanols } \alpha \text{ to } \omega.$$

In addition, the copolymer may contain a cationically reactive monomer, i.e., a (meth)acrylate monomer having a cationically reactive functional group. Examples of such monomers include, for example, glycidyl acrylate, glycidyl methacrylate, hydroxyethyl acrylate, hydroxyethyl methacrylate, hydroxypropyl methylacrylate, hydroxybutyl acrylate and alkoxysilylalkyl (meth)acrylates, such as trimethoxysilylpropyl acrylate.

For stability of the polymerizable composition, the copolymer contains essentially no acid functional monomers, whose presence could initiate polymerization of the epoxy resin prior to UV curing. For the same reason, it is preferred that the copolymer not contain any amine-functional monomers. Furthermore, it is preferred that the copolymer not contain any acrylic monomers having moieties sufficiently basic so as to inhibit cationic cure of the adhesive composition.

The THFA copolymer generally comprises polymerized monomer units of:
(A) 40-60 wt %, and preferably 50-60 wt %, of tetrahydrofurfuryl (meth)acrylate; (B) 40-60 wt %, and preferably 40-50 wt %, of $C_1$-$C_8$ (preferably $C_3$-$C_6$) alkyl (meth) acrylate ester monomers; and (C) 0-10 wt %, and preferably 1-5 wt % of cationically reactive functional monomers, wherein the sum of A)-C) is 100 wt %.

The adhesive compositions can comprise one or more THFA copolymers in various amounts, depending on the desired properties of the adhesive. Desirably, the adhesive composition comprises one or more THFA copolymers in an amount of from 15-50 parts, and preferably 25-35 parts, by weight based on 100 parts total weight of monomers/copolymers in the adhesive composition.

Thermoplastic Polyesters

The provided adhesives may include one or more thermoplastic polyesters. Suitable polyester components include semi-crystalline polyesters as well as amorphous and branched polyesters.

Thermoplastic polyesters may include polycaprolactones and polyesters having hydroxyl and carboxyl termination, and may be amorphous or semi-crystalline at room temperature. More preferred are hydroxyl terminated polyesters that are semi-crystalline at room temperature. A material that is "amorphous" has a glass transition temperature but does not display a measurable crystalline melting point as determined on a differential scanning calorimeter ("DSC"). Preferably, the glass transition temperature is less than about 100° C. A material that is "semi-crystalline" displays a crystalline melting point as determined by DSC, preferably with a maximum melting point of about 120° C.

Crystallinity in a polymer can also be reflected by the clouding or opaqueness of a sheet that had been heated to an amorphous state as it cools. When the polyester polymer is heated to a molten state and knife-coated onto a liner to form a sheet, it is amorphous and the sheet is observed to be clear and fairly transparent to light. As the polymer in the sheet material cools, crystalline domains form and the crystallization is characterized by the clouding of the sheet to a translucent or opaque state. The degree of crystallinity may be varied in the polymers by mixing in any compatible combination of amorphous polymers and semi-crystalline polymers having varying degrees of crystallinity. It is generally preferred that material heated to an amorphous state be allowed sufficient time to return to its semi-crystalline state before use or application. The clouding of the sheet provides a convenient non-destructive method of determining that crystallization has occurred to some degree in the polymer.

The polymers may include nucleating agents to increase the rate of crystallization at a given temperature. Useful nucleating agents include microcrystalline waxes. A suitable wax could include an alcohol comprising a carbon chain having a length of greater than 14 carbon atoms (CAS #71770-71-5) or an ethylene homopolymer (CAS #9002-88-4) sold by Baker Hughes, Houston, Tex., as UNILIN™ 700.

Preferred polyesters are solid at room temperature. Preferred polyester materials have a number average molecular weight of about 7,500 g/mol to 200,000 g/mol, more preferably from about 10,000 g/mol to 50,000 g/mol, and most preferably, from about 15,000 g/mol to 30,000 g/mol.

Polyester components useful in the invention comprise the reaction product of dicarboxylic acids (or their diester equivalents) and diols. The diacids (or diester equivalents) can be saturated aliphatic acids containing from 4 to 12 carbon atoms (including branched, unbranched, or cyclic materials having 5 to 6 carbon atoms in a ring) and/or aromatic acids containing from 8 to 15 carbon atoms. Examples of suitable aliphatic acids are succinic, glutaric, adipic, pimelic, suberic, azelaic, sebacic, 1,12-dodecanedioic, 1,4-cyclohexanedicarboxylic, 1,3-cyclopentanedicarboxylic, 2-methyl succinic, 2-methylpentanedioic, 3-methylhexanedioic acids, and the like. Suitable aromatic acids include terephthalic acid, isophthalic acid, phthalic acid, 4,4'-benzophenone dicarboxylic acid, 4,4'-diphenylmethanedicarboxylic acid, 4,4'-diphenylthioether dicarboxylic acid, and 4,4'-diphenylamine dicarboxylic acid. Preferably, the structure between the two carboxyl groups in the diacids contain only carbon and hydrogen, and more preferably, the structure is a phenylene group. Blends of the foregoing diacids may be used.

The diols include branched, unbranched, and cyclic aliphatic diols having from 2 to 12 carbon atoms. Examples of suitable diols include ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, cyclobutane-1,3-di(2'-ethanol), cyclohexane-1,4-dimethanol, 1,10-decanediol, 1,12-dodecanediol, and neopentyl glycol. Long chain diols including poly(oxyalkylene)glycols in which the alkylene group contains from 2 to 9 carbon atoms, preferably 2 to 4 carbon atoms, may also be used. Blends of the foregoing diols may be used.

Useful, commercially available hydroxyl terminated polyester materials include various saturated linear, semicrystalline copolyesters available from Evonik Industries, Essen, North Rhine-Westphalia, Germany, such as DYNAPOL™ S1401, DYNAPOL™ S1402, DYNAPOL™ S1358, DYNAPOL™ S1359, DYNAPOL™ S1227, and DYNAPOL™ S1229. Useful saturated, linear amorphous copolyesters available from Evonik Industries include DYNAPOL™ 1313 and DYNAPOL™ 51430.

The adhesive may include one or more thermoplastic polyesters in an amount that varies depending on the desired properties of the adhesive layer. Desirably, the adhesive includes one or more thermoplastic polyesters in an amount of up to 50 percent by weight, based on the total weight of monomers/copolymers in the adhesive composition. Where present, the one or more thermoplastic polyesters are preferably present in an amount of at least 5 percent, at least 10 percent, at least 12 percent, at least 15 percent, or at least 20 percent by weight based on the total weight of monomers/copolymers in the adhesive composition. Where present, the one or more thermoplastic polyesters are preferably present in an amount of at most 20 percent, at most 25 percent, at most 30 percent, at most 40 percent, or at most 50 percent by weight based on the total weight of monomers/copolymers in the adhesive composition.

Epoxy Resins

In preferred embodiments, the adhesive comprises one or more epoxy resins, which are polymers characterized by epoxide functional groups. Epoxy resins or epoxides that are useful in the composition of the present disclosure may be any organic compound having at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, hydrogenated, or mixtures thereof. Preferred epoxides contain more than 1.5 epoxy group per molecule and preferably at least 2 epoxy groups per molecule. The useful materials typically have a weight average molecular weight of 150 g/mol to 10,000 g/mol, and more typically 180 g/mol to 1,000 g/mol. The molecular weight of the epoxy resin is usually selected to provide the desired properties of the cured adhesive. Suitable epoxy resins include linear polymeric epoxides having terminal epoxy groups (e.g., a diglycidyl ether of a polyoxyalkylene glycol), polymeric epoxides having skeletal epoxy groups (e.g., polybutadiene poly epoxy), and polymeric epoxides having pendant epoxy groups (e.g., a glycidyl methacrylate polymer or copolymer), and mixtures thereof. The epoxide-containing materials include compounds having the general formula:

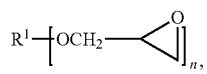

where $R^1$ is an alkyl, alkyl ether, or aryl group and n is in the range of from 1 to 6.

Epoxy resins include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Also useful are polyhydric phenolic formaldehyde condensation products as well as polyglycidyl ethers that contain as reactive groups only epoxy groups or hydroxy groups. Useful curable epoxy resins are also described in various publications including, for example, "Handbook of Epoxy Resins" by Lee and Nevill, McGraw-Hill Book Co., New York (1967), and Encyclopedia of Polymer Science and Technology, 6, p. 322 (1986).

The choice of the epoxy resin used depends upon its intended end use. For example, epoxides with flexible backbones may be desired where a greater amount of ductility is needed in the bond line. Materials such as diglycidyl ethers of bisphenol A and diglycidyl ethers of bisphenol F can provide desirable structural adhesive properties that these materials attain upon curing, while hydrogenated versions of these epoxies may be useful for compatibility with substrates having oily surfaces.

Examples of commercially available epoxides useful in the present disclosure include diglycidyl ethers of bisphenol A (e.g, those available under the trade names EPON™ 828, EPON™ 1001, EPON™ 1004, EPON™ 2004, EPON™ 1510, and EPON™ 1310 from Momentive Specialty Chemicals, Inc., Waterford, N.Y. and those under the trade designations D.E.R.™ 331, D.E.R.™ 332, D.E.R.™ 334, and D.E.N.™ 439 available from Dow Chemical Co., Midland, Mich.); diglycidyl ethers of bisphenol F (that are available, e.g., under the trade designation ARALDITE™ GY 281 available from Huntsman Corporation); silicone resins containing diglycidyl epoxy functionality; flame retardant epoxy resins (e.g., that are available under the trade designation D.E.R.™ 560, a brominated bisphenol type epoxy resin available from Dow Chemical Co.); and 1,4-butanediol diglycidyl ethers.

Epoxy containing compounds having at least one glycidyl ether terminal portion, and preferably, a saturated or unsaturated cyclic backbone may optionally be added to the composition as reactive diluents. Reactive diluents may be added for various purposes such as to aid in processing, e.g., to control the viscosity in the composition as well as during curing, make the cured composition more flexible, and/or compatibilize materials in the composition.

Examples of such diluents include: diglycidyl ether of cyclohexanedimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N'N'-tetraglycidyl meta-xylylene diamine, and vegetable oil polyglycidyl ether. Reactive diluents are commercially available as HELOXY™ 107 and CARDURA™ N10 from Momentive Specialty Chemicals, Inc. The composition may contain a toughening agent to aid in providing the desired overlap shear, peel resistance, and impact strength.

The adhesive composition desirably contains one or more epoxy resins having an epoxy equivalent weight of from 100 g/mol to 1500 g/mol. More desirably, the adhesive contains one or more epoxy resins having an epoxy equivalent weight of from 300 g/mol to 1200 g/mol. Even more desirably, the adhesive contains two or more epoxy resins, wherein at least one epoxy resin has an epoxy equivalent weight of from 300 g/mol to 500 g/mol, and at least one epoxy resin has an epoxy equivalent weight of from 1000 g/mol to 1200 g/mol.

The adhesive composition may comprise one or more epoxy resins in an amount, which varies depending on the desired properties of the structural adhesive layer. Desirably, the adhesive composition comprises one or more epoxy resins in an amount of at least 20, at least 25, at least 35, at least 40, at least 50 parts, or at least 55 parts by weight, based on the 100 parts total weight of the adhesive composition. In desirable embodiments, the one or more epoxy resins are present in an amount of at most 45, at most 50 parts, at most 75 parts, or at most 80 parts by weight, based on the 100 parts total weight of the monomers/copolymers in the adhesive composition.

Vinyl Ethers

Vinyl ethers represent a different class of monomers that, like epoxy resins, are cationic polymerizable. These monomers can be used as an alternative to, or in combination with, the epoxy resins disclosed herein.

The vinyl ether monomer has a high electron density of double bonds and produces a stable carbocation, enabling this monomer to have high reactivity in cationic polymerizations. To avoid inhibiting the cationic polymerization, the vinyl ether monomer may be limited to those not containing nitrogen. Examples thereof include methyl vinyl ether, ethyl vinyl ether, tert-butyl vinyl ether, isobutyl vinyl ether, triethylene glycol divinyl ether, and 1,4-cyclohexane dimethanol divinyl ether. Preferred examples of the vinyl ether monomer include triethylene glycol divinyl ether and cyclohexane dimethanol divinyl ether (both sold under the trade designation RAPI-CURE by Ashland, Inc., Covington, Ky.).

Liquid Polyether Polyols

The adhesive composition can further include one or more liquid (under ambient conditions) hydroxy-functional polyether. Preferably, the one or more hydroxy-functional polyethers include a polyether polyol. The polyether polyol can be present in an amount of at least 5 parts, at least 10 parts, or at most 15 parts relative to 100 parts total weight of monomers/copolymers in the adhesive composition. In some embodiments, the polyether polyol is present in an amount of at most 15 parts, at most 20 parts, or at most 30 parts relative to 100 parts total weight of monomers/copolymers in the adhesive composition.

Examples of hydroxy-functional polyethers include, but are not limited to, polyoxyethylene and polyoxypropylene glycols; polyoxyethylene and polyoxypropylene triols and polytetramethylene oxide glycols.

In the provided methods of bonding, the polyoxyalkylene polyols are particularly suitable for retarding the curing reaction so that the open time of the adhesive composition can be increased. As used herein, the "open time" refers to the period of time after an adhesive composition has been irradiated, during which time the adhesive composition remains sufficiently uncured for a second substrate to be bonded thereto.

The open time of the adhesive composition is preferably at least 2 minutes after exposure to an energy dose of about 1.6 $J/cm^2$ of actinic radiation. If, however, one or both adherends to be bonded together are translucent to UV radiation to which the structural adhesive layer is to be exposed, then open time is of lesser relevance. In these cases, UV irradiation can be effected through the translucent substrate after adherends have been mutually attached. When both substrates of the assembly are opaque, the adhesive can be exposed to actinic radiation prior to attaching the second substrate thereto. In this case, an open time of at least 2 minutes is desirable to allow for suitable workability of the structural adhesive layer.

Suitable hydroxy-functional poly(alkylenoxy) compounds include, but are not limited to, the POLYMEG™ series of polytetramethylene oxide glycols (from Lyondellbasell, Inc., Jackson, Tenn.), the TERATHANE™ series of polytetramethylene oxide glycols (from Invista, Newark, Del.); the POLYTHF™ series of polytetramethylene oxide glycol (from BASF SE, Ludwigshafen, Germany); the ARCOL™ series of polyoxypropylene polyols (from Bayer MaterialScience LLC, Pittsburgh, Pa.) and the VORANOL™ series of polyether polyols (from Dow Chemical Company, Midland, Mich.).

Hydroxyl-Functional Film-Forming Polymers

The adhesive layer further contains at least one hydroxyl-functional film-forming polymer having at least one and desirably at least two hydroxyl groups. As used herein, the term "hydroxyl-functional film-forming polymer" does not include the polyether polyols described above, which also contain hydroxyl groups. Desirably, the film-forming polymer are substantially free of other "active hydrogen" containing groups such as amino and mercapto moieties. Further, the film-forming polymer or polymers are also desirably substantially free of groups, which may be thermally and/or photolytically unstable so that the compounds will not decompose when exposed to actinic radiation and/or heat during curing.

The hydroxyl-containing film-forming polymer contains two or more primary or secondary aliphatic hydroxyl groups (i.e., the hydroxyl group is bonded directly to a non-aromatic carbon atom). In some embodiments, the hydroxyl-functional film-forming polymer has a hydroxyl number of at least 0.01. It is believed the hydroxyl groups participate in the cationic polymerization with the epoxy resin.

The hydroxyl-functional film-forming polymer may be selected from phenoxy resins, ethylene-vinyl acetate ("EVA") copolymers (which are solid under ambient conditions), polycaprolactone polyols, polyester polyols, and polyvinyl acetal resins that are solid under ambient conditions. The hydroxyl group may be terminally situated, or may be pendent from a polymer or copolymer. Advantageously, the addition of a film-forming polymer to the adhesive composition can improve the dynamic overlap shear strength and/or decrease the cold flow of the adhesive layer.

One useful class of hydroxyl-containing film-forming polymers is hydroxy-containing phenoxy resins. Desirable phenoxy resins include those derived from the polymerization of a diglycidyl bisphenol compound. Typically, the phenoxy resin has a number average molecular weight of less than 60,000 g/mol, desirably in the range of 20,000 g/mol to 30,000 g/mol. Commercially available phenoxy resins include, but are not limited to, PAPHEN™ PKHP-200, available from Inchem Corp., Rock Hill, S.C. and the SYN FAC™ series of polyoxyalkylated bisphenol A from Milliken Chemical, Spartanburg, S.C.) such as SYN FAC™ 8009, 8024, 8027, 8026, and 8031.

Another useful class of hydroxyl-containing film-forming polymers is that of EVA copolymer resins. It is believed that these resins contain small amounts of free hydroxyl groups, and that EVA copolymers are further deacetylated during cationic polymerization. Hydroxyl-containing EVA resins can be obtained, for example, by partially hydrolyzing a precursor EVA copolymer.

Suitable ethylene-vinyl acetate copolymer resins include, but are not limited to, thermoplastic EVA copolymer resins containing at least 28 percent by weight vinyl acetate. In one embodiment, the EVA copolymer comprises a thermoplastic copolymer containing at least 28 percent by weight vinyl acetate, desirably at least 40 percent by weight vinyl acetate, more desirably at least 50 percent by weight vinyl acetate, and even more desirably at least 60 percent by weight vinyl acetate by weight of the copolymer. In a further embodiment, the EVA copolymer contains an amount of vinyl acetate in the range of from 28 to 99 weight percent of vinyl acetate, desirably from 40 to 90 weight percent of vinyl acetate, more desirably from 50 to 90 weight percent of vinyl acetate, and even more desirably from 60 to 80 weight percent vinyl acetate in the copolymer.

Examples of commercially available EVA copolymers include, but are not limited to, the ELVAX™ series, including ELVAX™ 150, 210, 250, 260, and 265 from E. I. Du Pont de Nemours and Co., Wilmington, Del., ATEVA™ series from Celanese, Inc., Irving, Tex.); LEVAPREN™ 400 from Bayer Corp., Pittsburgh, Pa. including LEVAPREN™ 450, 452, and 456 (45 weight percent vinyl acetate); LEVAPREN™ 500 HV (50 weight percent vinyl acetate); LEVAPREN™ 600 HV (60 weight percent vinyl acetate); LEVAPREN™ 700 HV (70 weight percent vinyl acetate); and LEVAPREN™ KA 8479 (80 weight percent vinyl acetate), each from Lanxess Corp., Cologne, Germany.

Additional useful film-forming polymers include the TONE™ series of polycaprolactone polyols series available from Dow Chemical, the CAPA™ series of polycaprolactone polyols from Perstorp Inc., Perstorp, Sweden, and the DESMOPHEN™ series of saturated polyester polyols from Bayer Corporation, Pittsburgh, Pa., such as DESMOPHEN™ 631A 75.

The adhesive layer comprises one or more hydroxyl-containing film-forming polymers resins in an amount, which varies depending on the desired properties of the structural adhesive layer. The adhesive composition can include one or more hydroxyl-containing film-forming polymer resins in an amount of at least 10 parts, at least 15 parts, at least 20 parts, or at least 25 parts by weight, based on 100 parts total weight of monomers/copolymers in the adhesive composition. In some embodiments, the one or more hydroxyl-containing film-forming polymer resins can be present in an amount of at most 20 parts, at most 25 parts, or at most 50 parts, based on 100 parts total weight of monomers/copolymers in the adhesive composition.

Photoinitiators

Useful photoinitiators include photoinitiators used to i) polymerize precursor polymers (for example, in some embodiments, tetrahydrofurfuryl (meth)acrylate copolymer) and ii) those used to ultimately polymerize the adhesive layer bonding the hardware to vehicular glass or any other substrate.

Photoinitiators for the former include benzoin ethers such as benzoin methyl ether and benzoin isopropyl ether; substituted acetophenones such as 2,2 dimethoxy-1,2-diphenylethanone, available as IRGACURE™ 651 (BASF SE) or ESACURE™ KB-1 (Sartomer Co., West Chester, Pa.), dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. Such photoinitiators preferably are present in an amount of from 0.1 to 1.0 pbw per 100 parts of the precursor polymer composition.

Photoinitiators particularly useful for the latter include ionic photoacid generators, which are compounds that can generate acids upon exposure to actinic radiation. These are extensively used to initiate cationic polymerizations, in which case they are referred to as cationic photoinitiators.

Useful ionic photoacid generators include bis(4-t-butylphenyl) iodonium hexafluoroantimonate (FP5034™ from Hampford Research Inc., Stratford, Conn.), a mixture of triarylsulfonium salts (diphenyl(4-phenylthio) phenylsufonium hexafluoroantimonate, bis(4-(diphenylsulfonio)phenyl)sulfide hexafluoroantimonate) available as Syna PI-6976™ from Synasia Metuchen, N.J., (4-methoxyphenyl)phenyl iodonium triflate, bis(4-fert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy)phenyl]phenyliodonium hexafluoroantimonate), (4-isopropylphenyl)(4-methylphenyl)iodonium tetrakis (pentafluorophenyl) borate (available as Rhodorsil 2074™ from Bluestar Silicones, East Brunswick, N.J.), bis(4-methylphenyl) iodonium hexafluorophosphate (available as Omnicat440™ from IGM Resins Bartlett, Ill.), 4-(2-hydroxy-1-tetradecycloxy)phenyl]phenyl iodonium hexafluoroantimonate, triphenyl sulfonium hexafluoroantimonate (available as CT-548™ from Chitec Technology Corp. Taipei, Taiwan), diphenyl(4-phenylthio)phenylsufonium hexafluorophosphate, bis(4-(diphenylsulfonio)phenyl)sulfide bis(hexafluorophosphate), diphenyl(4-phenylthio)phenylsufonium hexafluoroantimonate, bis(4-(diphenylsulfonio)phenyl)sulfide hexafluoroantimonate, and blends of these triarylsulfonium salts available from Synasia, Metuchen, N.J. as SYNA™ PI-6992 and SYNA™ PI-6976 for the $PF_6$ and $SbF_6$ salts, respectively. Similar blends of ionic photoacid generators are available from Aceto Pharma Corporation, Port Washington, N.Y. as UVI-6992 and UVI-6976.

The photoinitiator is used in amounts sufficient to effect the desired degree of crosslinking of the copolymer. The desired degree of crosslinking may vary, depending on the desired adhesive properties and the film thickness. The amount of the photoinitiator necessary to effect the desired degree of crosslinking will depend on the quantum yield of the photoinitiator (the number of molecules of acid released per photon absorbed), the permeability of the polymer matrix, the wavelength and duration of irradiation and the temperature. Generally the photoinitiator is used in amounts of at least 0.001 parts, at least 0.005 parts, at least 0.01 parts, at least 0.05 parts, at least 0.1 parts, or at least 0.5 parts by weight relative to 100 parts by weight of total monomer/copolymer in the adhesive composition. The photoinitiator is generally used in amounts of at most 5 parts, at most 3 parts, at most 1 part, at most 0.5 parts, at most 0.3 parts, or at most 0.1 parts by weight relative to 100 parts by weight of total monomer/copolymer in the adhesive composition.

Optional Additives

The adhesive composition may further contain any of a number of optional additives. Such additives may be homogeneous or heterogeneous with one or more components in the adhesive composition. Heterogenous additives may be discrete (e.g., particulate) or continuous in nature.

Aforementioned additives can include, for example, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, and the like, such as silica, glass, clay, talc, pigments, colorants, glass beads or bubbles, and antioxidants, so as to reduce the weight and/or cost of the structural adhesive layer composition, adjust viscosity, and/or provide additional reinforcement or modify the thermal conductivity of adhesive compositions and articles used in the provided methods so that a more rapid or uniform cure may be achieved.

In some embodiments, the adhesive contains one or more fiber reinforcement materials. Advantageously, use of a fiber reinforcement material can provide a structural adhesive layer that has improved cold flow properties, limited stretchability, and enhanced strength. Preferably, the one or more fiber reinforcement materials has a certain degree of porosity that enables the photoinitiator, which is generally dispersed throughout the adhesive, to be activated by UV light and properly cured without the need for heat.

The one or more fiber reinforcements may comprise one or more fiber-containing webs including, but not limited to, woven fabrics, nonwoven fabrics, knitted fabrics, and a unidirectional array of fibers. The one or more fiber reinforcements could comprise a nonwoven fabric, such as a scrim.

Materials for making the one or more fiber reinforcements may include any fiber-forming material capable of being formed into one of the above-described webs. Suitable fiber-forming materials include, but are not limited to, polymeric materials such as polyesters, polyolefins, and aramids; organic materials such as wood pulp and cotton; inorganic materials such as glass, carbon, and ceramic; coated fibers having a core component (i.e., any of the above fibers) and a coating thereon; and combinations thereof.

Further options and advantages of the fiber reinforcement materials are described in U.S. Patent Publication No. 2002/0182955 (Weglewski et al.).

Curing Conditions

As discussed earlier, the monomer mixture and the photoinitiator may be irradiated using various activating UV light sources to polymerize the monomer component(s).

Light sources based on light emitting diodes can enable a number of surprising advantages with respect to the provided methods of bonding. These light sources can be monochromatic, which for the purposes of this disclosure implies that the spectral power distribution is characterized by a very narrow wavelength distribution (i.e., confined within a 50 nm range or less). Advantageously, monochromatic ultraviolet light can reduce thermal damage or harmful deep UV effects to coatings and substrates being irradiated. In larger scale applications, the lower power consumption of UV-LED sources can also allow for energy savings and reduced environmental impact.

Figure 5:
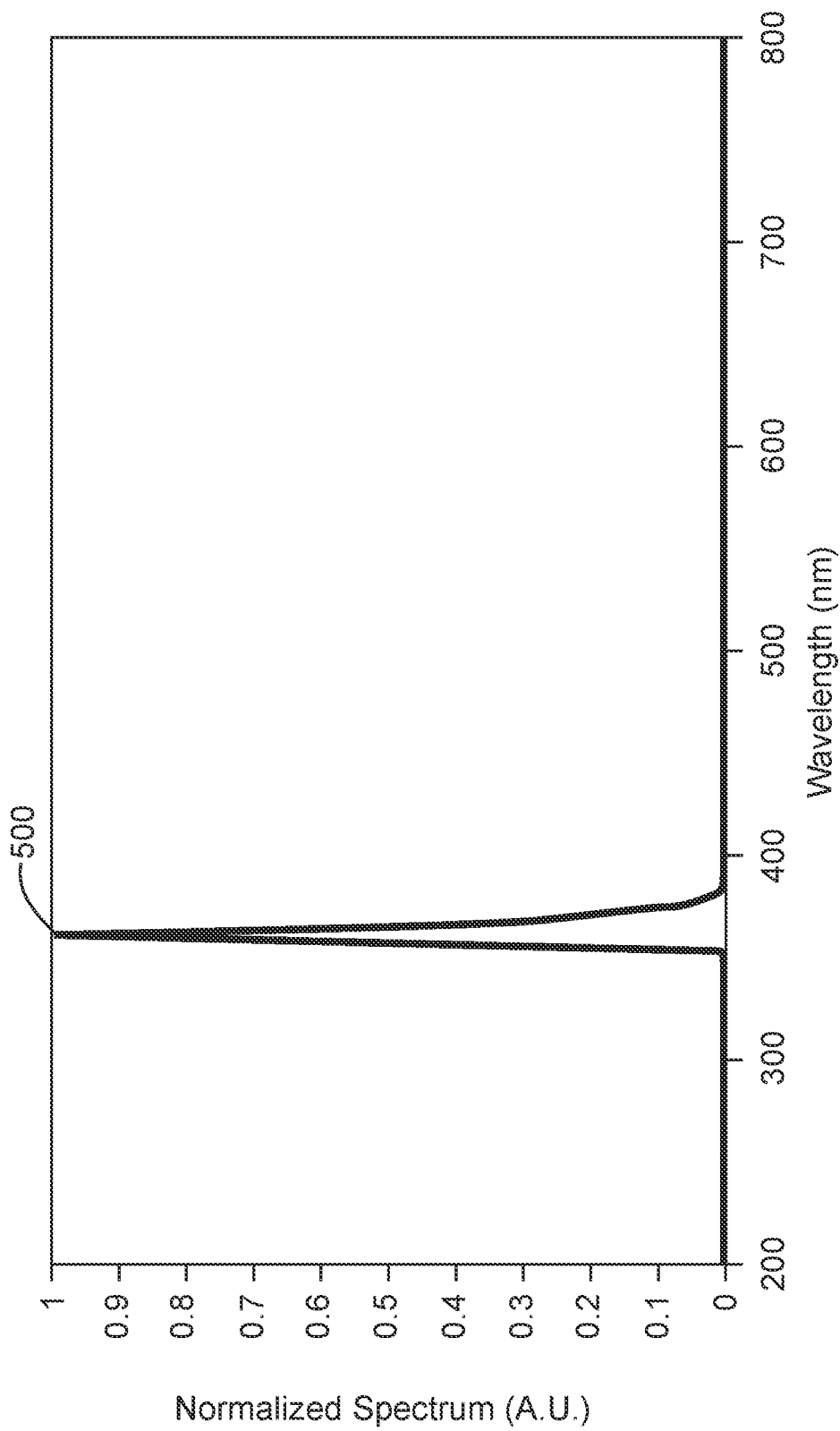
FIG. 5 shows the spectral power distribution of a source of ultraviolet radiation according to an exemplary method of adhering hardware to glass.

FIG. 5 shows the spectral power distribution of an exemplary UV-LED light source having a peak (designated with the numeral 500) characterized by a wavelength (at peak intensity) of approximately 365 nm. As FIG. 5 illustrates, the UV-LED light source emits light over a narrow range of wavelengths around 365 nm. More generally, the spectral power distribution can show a peak intensity at a wavelength of at least 315 nm, at least 330 nm, or at least 350 nm. In some embodiments, the spectral power distribution shows a peak intensity at a wavelength of at most 400 nm, at most 390 nm, or at most 380 nm.

As an option, the spectral power distribution can substantially exclude light output at wavelengths below a threshold value. The threshold wavelength value could be, for example, 280 nm, 290 nm, or 300 nm. As will be described in more detail below, a low wavelength cutoff can be advantageous in providing more uniform kinetics in adhesive polymerization along the thickness dimension of the adhesive layer.

It was discovered that matching the spectral power distribution of the photoinitiator with the absorption spectrum of UV light source too closely can result in inferior curing of thick adhesive layers. Without intending to be bound by theory, it is believed that aligning the peak output of the UV source with the excitation wavelength of the photoinitiator can be undesirable because it leads to formation of a "skin" layer that dramatically increases the viscosity of the monomer mixture and progressively hinders the ability of available monomer to access reactive polymer chain ends. The result of this lack of access is a layer of uncured, or only partially cured, adhesive beneath the skin layer and subsequent adhesive failure.

This technical problem can be alleviated by using a UV light source with a spectral power distribution that is offset from the primary excitation wavelength at which the photoinitiator is activated. As used herein, "offset" between the spectral power distribution and a given wavelength means that the given wavelength does not overlap with wavelengths over which the output of the UV light source has significant intensity. In a preferred embodiment, the offset referred to above is a positive offset (i.e., the spectral power distribution spans wavelengths that are higher than the primary excitation wavelength of the photoinitiator).

Figure 6:
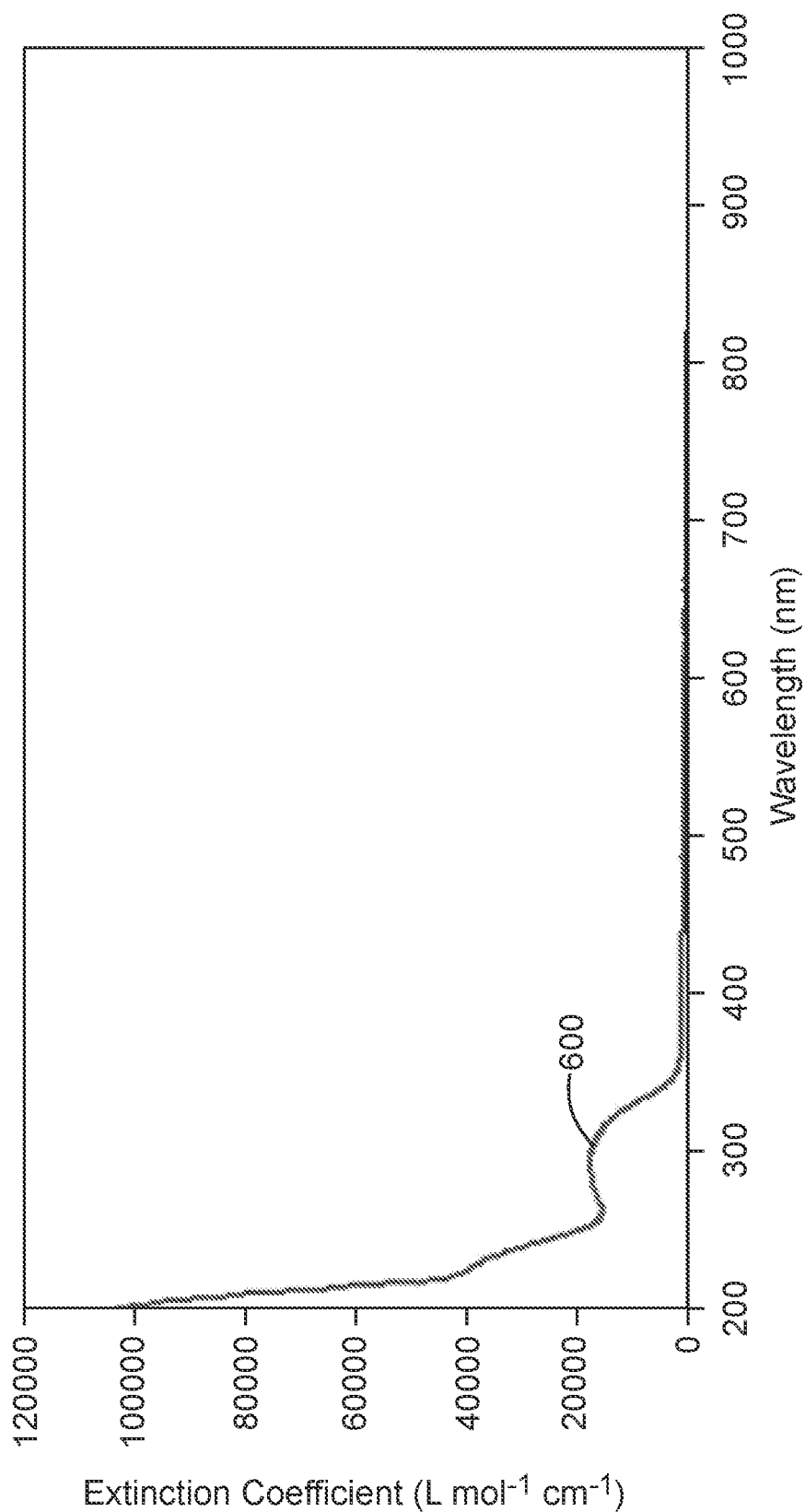
FIG. 6 shows an ultraviolet light absorption curve for an exemplary cationic photoinitiator.

In this disclosure, the primary excitation wavelength can be defined at the highest wavelength absorption peak (i.e., the local maximum absorption peak located at the highest wavelength) in the UV absorption curve of the photoinitiator, as determined by spectroscopic measurement at a photoinitiator concentration of 0.03 wt % in acetonitrile solution. An exemplary UV absorption curve is shown in FIG. 6, which charts the normalized absorption of light at various wavelengths by the photoinitiator UVI-6976 by Aceto Pharma Corporation, which constitutes a mixture of triarylsulfonium hexafluoroantimonate salts in propylene carbonate/acetonitrile solution. As shown in FIG. 6, the highest wavelength absorption peak (designated with the numeral 600) is located at a wavelength of approximately 300 nm.

In some embodiments, the highest wavelength absorption peak is located at a wavelength of at most 395 nm, at most 375 nm, or at most 360 nm.

In exemplary embodiments, the difference in wavelength between the highest wavelength absorption peak of the photoinitiator and the peak intensity of the UV light source is in the range of from 30 nm to 110 nm, preferably from 40 nm to 90 nm, and more preferably from 60 nm to 80 nm.

The UV radiation exposure time required to obtain sufficient activation of the photoinitiator(s) is not particularly restricted. Typically, the adhesive layer is exposed to ultraviolet radiation over an exposure period of at least 0.25 seconds, at least 0.35 seconds, at least 0.5 seconds, or at least 1 second. The adhesive layer can be exposed to ultraviolet radiation over an exposure period of at most 10 minutes, at most 5 minutes, at most 2 minutes, at most 1 minute, or at most 20 seconds.

Based on the exposure time used, the UV radiation should provide a sufficient energy density to obtain a functional cure. In some embodiments, the UV radiation can deliver an energy density of at least 0.5 J/cm$^2$, at least 0.75 J/cm$^2$, or at least 1 J/cm$^2$. In the same or alternative embodiments, the UV radiation can deliver an energy density of at most 15 J/cm$^2$, at most 12 J/cm$^2$, or at most 10 J/cm$^2$.

Advantageously, the curing methods described above can enable the UV light to cure adhesives with thicknesses greater than would normally be viable using conventional curing methods. Thicker adhesives, and particularly foamed adhesives that can compress and/or conform when urged against non-planar surfaces, can bridge the gap between opposing adherent surfaces. This allows the adhesive to wet out both surfaces and obtain a strong and reliable (i.e. consistent) bond.

When bonding to vehicular glass, there is often a significant topological mismatch between the opposing surfaces of the hardware and glass to be bonded. For example, automotive windshields generally have significant curvature, and this curvature can vary significantly based on the make and model of the automobile. In some applications, to obtain adequate adhesive wet out on both the hardware and the glass, the adhesive layer should have a maximum thickness of at least 0.5 millimeters, at least 0.6 millimeters, or at least 1 millimeter.

Adhesive Properties

The provided adhesives, when cured, preferably have an Overlap Shear Strength (based on the test methods described herein) of at least 0.75 MPa, more preferably at least 1.0 MPa, and most preferably at least 1.5 MPa. Cured adhesives having a particularly high overlap shear strength are herein referred to as structural adhesives. Structural adhesives are cured adhesives that have an Overlap Shear Strength of at least 3.5 MPa, more preferably at least 5 MPa, and most preferably at least 7 MPa.

In some embodiments, the adhesive layer 114, after curing, provides at least one of i) an Overlap Shear Strength of at least 5 MPa, ii) a Cleavage Resistance of at least 40 N, and iii) a Creep Test result of at most 500% strain, based on the test methods described herein. In a preferred embodiment, the adhesive layer 114 provides each of i), ii), and iii).

Preferably, the adhesive layer 114, after curing, further displays a Tensile Strength of at least 60 N, based on the test methods described herein.

The provided adhesives should also have sufficient strength to hold automotive hardware stationary against a glass substrate without delaminating or sagging under gravity prior to being cured (i.e., in the "green" state). These aspects can be quantified using, for example, the 90° Peel Adhesion test, Cleavage Resistance, and Creep Test.

Preferably, the adhesive layer 114, prior to being irradiated with ultraviolet radiation, displays a 90° Peel Adhesion of at least 9 N based on the test methods described herein.

Preferably, the adhesive layer 114, prior to being irradiated with ultraviolet radiation, displays a Cleavage Resistance of at least 40 N, at least 50 N, or at least 60 N.

Preferably, the adhesive layer 114, prior to being irradiated with ultraviolet radiation, displays a Creep Test result of at most 500%, at most 300%, or at most 200%.

The provided bonding methods can be further exemplified by the following non-exhaustive list of embodiments:

1. A method of bonding some structure (e.g., hardware) to glass such as, e.g., vehicular and/or architectural (vehicular/architectural) glass, including: providing the glass comprising a first sheet of glass (e.g., tempered glass), a polymeric backing, and a second sheet of glass (e.g., tempered glass), laminated in that order via an autoclaving process or a similar process of applied heat and pressure over time; disposing an adhesive layer on a bonding surface of either the structure (e.g., hardware) or the glass (e.g., vehicular/architectural glass), the adhesive layer including a curable composition that is dimensionally stable at ambient conditions; either before or after disposing the adhesive layer on the bonding surface, irradiating the adhesive layer with ultraviolet radiation to initiate curing of the curable composition; placing the structure (e.g., hardware) so as to be bonded to the glass (e.g., vehicular/architectural glass) by the adhesive layer; and allowing the adhesive layer to cure.

2. The method of embodiment 1, further including heating the adhesive layer to a temperature in the range of from about 35° C. to about 180° C. for a period of time in the range of from 3 minutes to 35 minutes to accelerate curing of the adhesive layer.

3. The method of embodiment 2, where the temperature is in the range of from about 70° C. to about 150° C.

4. The method of embodiment 3, where the temperature is in the range of from about 90° C. to about 120° C.

5. The method of any one of embodiments 2-4, where the period of time is in the range of from about 2 minutes to about 25 minutes.

6. The method of embodiment 5, where the period of time is in the range of from about 5 minutes to about 15 minutes.

7. The method of any one of embodiments 1-6, where the curable composition includes: a) in the range of from about 25 to about 80 parts by weight of one or more epoxy resins; b) in the range of from about 5 to about 30 parts by weight of one or more liquid polyether polyols; c) in the range of from about 10 to about 50 parts by weight of one or more hydroxyl-functional film-forming polymers or precursors thereof, where the sum of a) to c) is 100 parts by weight; and d) in the range of from about 0.1 to about 5 parts of a photoinitiator, relative to the 100 parts of a) to c).

8. The method of embodiment 7, where the curable composition includes: i) in the range of from about 15 to about 50 parts by weight of a tetrahydrofurfuryl (meth)acrylate copolymer; ii) in the range of from about 25 to about 50 parts by weight of the one or more epoxy resin components; iii) in the range of from about 5 to about 15 parts by weight of the one or more liquid polyether polyols; iv) in the range of from about 10 to about 25 parts by weight of one or more hydroxyl-functional film-forming polymers or precursors thereof; where the sum of i) to iv) is 100 parts by weight; and v) in the range of from about 0.1 to about 5 parts by weight of a cationic photoinitiator, relative to the 100 parts of i) to iv).

9. The method of embodiment 8, where the tetrahydrofurfuryl (meth)acrylate copolymer includes: A) in the range of from about 40 to about 60 wt % of tetrahydrofurfuryl (meth)acrylate; B) in the range of from about 40 to about 60 wt % of $C_1$-$C_8$ alkyl (meth)acrylate esters; and C) in the range of from 0 to about 10 wt % of cationically reactive functional monomers, where the sum of A)-C) is 100 wt %.

10. The method of any one of embodiments 1-6, where the curable composition includes: a) in the range of from about 15 to about 50 parts by weight of a semi-crystalline polyester resin; b) in the range of from about 20 to about 75 parts by weight of one or more epoxy resins; c) in the range of from about 5 to about 15 parts by weight of one or more liquid polyether polyols; d) in the range of from about 5 to about 20 parts by weight of one or more hydroxyl-functional film-forming polymers and precursors thereof, where the sum of a) to d) is 100 parts by weight; and e) in the range of from about 0.1 to about 5 parts by weight of a photoinitiator, relative to the 100 parts of a) to d)).

11. The method of any one of embodiments 1-10, where the photoinitiator has an ultraviolet absorption curve characterized by a highest wavelength absorption peak measured at a concentration of about 0.03 wt % in acetonitrile solution and where the ultraviolet radiation has a spectral power distribution positively offset from the wavelength of the highest wavelength absorption peak.

12. The method of embodiment 11, where the spectral power distribution has a peak intensity at a wavelength in the range of from about 315 nm to about 400 nm.

13. The method of embodiment 12, where the spectral power distribution has a peak intensity at a wavelength in the range of from about 350 nm to about 380 nm.

14. The method of any one of embodiments 11-13, where the spectral power distribution substantially excludes wavelengths below about 280 nm.

15. The method of embodiment 14, where the spectral power distribution substantially excludes wavelengths below about 290 nm.

16. The method of embodiment 15, where the spectral power distribution substantially excludes wavelengths below about 300 nm.

17. The method of any one of embodiments 11-16, where the highest wavelength absorption peak is located at a wavelength of at most about 395 nm.

18. The method of embodiment 17, where the highest wavelength absorption peak is located at a wavelength of at most about 375 nm.

19. The method of embodiment 18, where the highest wavelength absorption peak is located at a wavelength of at most about 360 nm.

20. The method of any one of embodiments 11-19, where the ultraviolet radiation is generated by a light emitting diode source.

21. A method of bonding a structure (e.g., hardware) to glass (e.g., vehicular/architectural glass), including: disposing an adhesive layer on a bonding surface of either the hardware or the vehicular/architectural glass, the adhesive layer including a curable composition comprised of: a) in the range of from about 25 to about 80 parts by weight of one or more epoxy resins; b) in the range of from about 5 to about 30 parts by weight of one or more liquid polyether polyols; c) in the range of from about 10 to about 50 parts by weight of one or more hydroxyl-functional film-forming polymers and precursors thereof, where the sum of a) to c) is 100 parts per weight; and d) in the range of from about 0.1 to about 5 parts by weight of a photoinitiator, relative to the 100 parts of a) to c); either before or after disposing the adhesive layer on the bonding surface, irradiating the adhesive layer with ultraviolet radiation to initiate curing of the curable composition; placing the structure (e.g., hardware) so as to be bonded to the glass (e.g., vehicular/architectural glass) by the adhesive layer; and allowing the adhesive layer to cure.

22. The method of embodiment 21, where the curable composition includes about 55 to about 80 parts by weight of the one or more epoxy resins.

23. The method of embodiment 21 or 22, where the curable composition includes about 10 to about 30 parts by weight of the one or more liquid polyether polyols.

24. The method of any one of embodiments 21-23, where the curable composition includes in the range of from about 20 to about 35 parts by weight of the one or more hydroxyl-functional film-forming polymers and precursors thereof.

25. A method of bonding a structure (e.g., hardware) to glass (e.g., vehicular/architectural glass), including: disposing an adhesive layer on a bonding surface of either the hardware or the vehicular/architectural glass, the adhesive layer including a curable composition comprised of: a) in the range of from about 1 to about 50 parts by weight of one or more resins selected from (meth)acrylate resins; b) in the range of from about 12 to about 40 parts by weight of one or more hydroxyl-functional film-forming polymers and precursors thereof; c) in the range of from about 20 to about 75 parts by weight of one or more epoxy resins; d) in the range of from about 10 to about 30 parts by weight of one or more polyether polyols, where the sum of a) to d) is 100 parts by weight; and e) in the range of from about 0.1 to about 5 parts by weight of a photoinitiator, relative to the 100 parts of a) to d); either before or after disposing the adhesive layer on the bonding surface, irradiating the adhesive layer with ultraviolet radiation to initiate curing of the curable composition; placing the structure (e.g., hardware) so as to be bonded to the glass (e.g., vehicular/architectural glass) by the adhesive layer; and allowing the adhesive layer to cure.

26. The method of embodiment 25, where the curable composition includes: i) in the range of from about 15 to about 50 parts by weight of a tetrahydrofurfuryl (meth) acrylate copolymer; ii) in the range of from about 25 to about 50 parts by weight of the one or more epoxy resins; iii) in the range of from about 5 to about 15 parts by weight of the one or more liquid polyether polyols; iv) in the range of from about 10 to about 25 parts by weight of one or more hydroxyl-functional film-forming polymers and precursors thereof, where the sum of i) to iv) is 100 parts by weight; and v) in the range of from about 0.1 to about 5 parts by weight of a cationic photoinitiator, relative to the 100 parts of i) to iv).

27. The method of embodiment 26, where the tetrahydrofurfuryl (meth)acrylate copolymer includes: A) in the range of from about 40 to about 60 wt % of tetrahydrofurfuryl (meth)acrylate; B) in the range of from about 40 to about 60 wt % of $C_1$-$C_8$ alkyl (meth)acrylate ester; and C) in the range of from 0 to about 10 wt % of cationically reactive functional monomer, where the sum of A)-C) is 100 wt %.

28. A method of bonding a structure (e.g., hardware) to glass (e.g., vehicular/architectural glass), including: disposing an adhesive layer on a bonding surface of either the hardware or the vehicular/architectural glass, the adhesive layer including a curable composition comprised of: a) in the range of from about 15 to about 50 parts by weight of a semi-crystalline polyester resin; b) in the range of from about 20 to about 75 parts by weight of one or more epoxy resins; c) in the range of from about 5 to about 15 parts by weight of one or more liquid polyether polyols; d) in the range of from about 5 to about 20 parts by weight of one or more hydroxyl-functional film-forming polymers and precursors thereof, where the sum of a) to d) is 100 parts by weight; and e) in the range of from about 0.1 to about 5 parts by weight of a photoinitiator, relative to the 100 parts of a) to d); either before or after disposing the adhesive layer on the bonding surface, irradiating the adhesive layer with ultraviolet radiation to initiate curing of the curable composition, where the photoinitiator has an ultraviolet absorption curve characterized by a highest wavelength absorption peak measured at a concentration of 0.03 wt % in acetonitrile solution and where the ultraviolet radiation has a spectral power distribution positively offset from the wavelength of the highest wavelength absorption peak; placing the structure (e.g., hardware) so as to be bonded to the glass (e.g., vehicular/architectural glass) by the adhesive layer; and allowing the adhesive layer to cure.

29. The method of any one of embodiments 21-28, where the one or more hydroxy-functional film forming polymers are selected from phenoxy resins, ethylene-vinyl acetate copolymers, polycaprolactone polyols, polyester polyols, and polyvinyl acetal resins.

30. The method of any one of embodiments 21-27, where the photoinitiator has an ultraviolet absorption curve characterized by a highest wavelength absorption peak measured at a concentration of about 0.03 wt % in acetonitrile solution and where the ultraviolet radiation has a spectral power distribution positively offset from the wavelength of the highest wavelength absorption peak.

31. The method of embodiment 28 or 30, where the spectral power distribution has a peak intensity at a wavelength in the range of from about 315 nm to about 400 nm.

32. The method of embodiment 31, where the spectral power distribution has a peak intensity at a wavelength in the range of from about 350 nm to about 380 nm.

33. The method of any one of embodiments 28 and 30-32, where the spectral power distribution substantially excludes wavelengths below about 280 nm.

34. The method of embodiment 33, where the spectral power distribution substantially excludes wavelengths below about 290 nm.

35. The method of embodiment 34, where the spectral power distribution substantially excludes wavelengths below about 300 nm.

36. The method of any one of embodiments 28 and 30-35, where the highest wavelength absorption peak is located at a wavelength of at most about 395 nm.

37. The method of embodiment 36, where the highest wavelength absorption peak is located at a wavelength of at most about 375 nm.

38. The method of embodiment 37, where the highest wavelength absorption peak is located at a wavelength of at most about 360 nm.

39. The method of any one of embodiments 28 and 30-38, where the ultraviolet radiation is generated by a light emitting diode source that emits monochromatic light.

40. A method of bonding a structure (e.g., hardware) to glass (e.g., vehicular/architectural glass), including: disposing an adhesive layer on a bonding surface of either the hardware or the vehicular/architectural glass, the adhesive layer including a photoinitiator having an ultraviolet absorption curve characterized by a highest wavelength absorption peak measured at a concentration of about 0.03 wt % in acetonitrile solution; either before or after disposing the adhesive layer on the bonding surface, irradiating the adhesive layer with ultraviolet radiation to initiate curing of the curable composition, where the ultraviolet radiation has a spectral power distribution positively offset from the wavelength of the highest wavelength absorption peak; placing the structure (e.g., hardware) so as to be bonded to the glass (e.g., vehicular/architectural glass) by the adhesive layer; and allowing the adhesive layer to cure.

41. The method of embodiment 40, where the spectral power distribution has a peak intensity at a wavelength in the range of from about 315 nm to about 400 nm.

42. The method of embodiment 41, where the spectral power distribution has a peak intensity at a wavelength in the range of from about 350 nm to about 380 nm.

43. The method of any one of embodiments 40-42, where the spectral power distribution substantially excludes wavelengths below about 280 nm.

44. The method of embodiment 43, where the spectral power distribution substantially excludes wavelengths below about 290 nm.

45. The method of embodiment 44, where the spectral power distribution substantially excludes wavelengths below about 300 nm.

46. The method of any one of embodiments 40-45, where the highest wavelength absorption peak is located at a wavelength of at most about 395 nm.

47. The method of embodiment 46, where the highest wavelength absorption peak is located at a wavelength of at most about 375 nm.

48. The method of embodiment 47, where the highest wavelength absorption peak is located at a wavelength of at most about 360 nm.

49. The method of any one of embodiments 40-48, where the ultraviolet radiation is generated by a light emitting diode source.

50. The method of any one of embodiments 40-49, where the adhesive layer has a maximum thickness of at least about 0.5 millimeters.

51. The method of embodiment 50, where the adhesive layer has a maximum thickness of at least about 0.6 millimeters.

52. The method embodiment 51, where the adhesive layer has a maximum thickness of at least about 1 millimeters.

53. The method of any one of embodiments 1-52, where the adhesive layer is a die-cut adhesive layer.

54. The method of any one of embodiments 1-53, where the adhesive layer is exposed to the ultraviolet radiation over an exposure period in the range of from about 0.25 seconds to about 10 minutes.

55. The method of embodiment 54, where the adhesive layer is exposed to the ultraviolet radiation over an exposure period in the range of from about 0.5 seconds to about 2 minutes.

56. The method of embodiment 55, where the adhesive layer is exposed to the ultraviolet radiation over an exposure period in the range of from about 0.5 second to about 20 seconds.

57. The method of any one of embodiments 1-56, where the ultraviolet radiation delivers an energy density in the range of from about 0.5 to about 15 $J/cm^2$.

58. The method of embodiment 57, where the ultraviolet radiation delivers an energy density in the range of from about 1 to about 10 $J/cm^2$.

59. The method of any one of embodiments 1-58, where the adhesive layer further includes a fiber reinforcement layer.

60. The method of embodiment 59, where the fiber reinforcement layer includes a woven scrim.

61. The method of any one of embodiments 1-60, where the adhesive layer, prior to being irradiated with the ultraviolet radiation, displays a 90° Peel Adhesion of at least about 9 N and a Creep Test result of at most about 500%.

62. The method of embodiment 61, where the adhesive layer, prior to being irradiated with the ultraviolet radiation, displays a Creep Test result of at most about 200%.

63. The method of any one of embodiments 1-62, where the adhesive layer, subsequent to being irradiated with the ultraviolet radiation, displays an Overlap Shear Strength of at least about 5 MPa, a Cleavage Resistance of at least about 40 N, and a Tensile Strength of at least about 60 N.

64. The method of embodiment 63, where the adhesive layer, subsequent to being irradiated with the ultraviolet radiation, displays a Cleavage Resistance of at least about 60 N.
65. The method of any one of embodiments 1-64, where the curable composition includes a photoacid generator.
66. The method of embodiment 65, where the photoacid generator includes a triarylsulfonium hexafluoroantimonate salt or triarylsulfonium hexafluorophosphate salt.
67. The method of any one of embodiments 11-20, 28, and 30-52, wherein the wavelength of the highest wavelength absorption peak coincides with the primary excitation wavelength of the photoinitiator.
68. A method of bonding an article to a substrate, including: disposing an adhesive layer on a bonding surface of either the article or the substrate, the adhesive layer including a photoinitiator having an ultraviolet absorption curve characterized by a highest wavelength absorption peak measured at a concentration of about 0.03 wt % in acetonitrile solution; either before or after disposing the adhesive layer on the bonding surface, irradiating the adhesive layer with ultraviolet radiation to initiate curing of the curable composition, where the ultraviolet radiation has a spectral power distribution positively offset from the wavelength of the highest wavelength absorption peak; placing the article so as to be bonded to the substrate by the adhesive layer; and allowing the adhesive layer to cure.
69. The method of embodiment 68, where the difference in wavelength between the highest wavelength absorption peak of the photoinitiator and the peak intensity of the UV light source is in the range of from about 30 nm to about 110 nm.
70. The method of embodiment 69, where the magnitude of the offset is in the range of from about 40 nm to about 90 nm.
71. The method of embodiment 70, where the magnitude of the offset is in the range of from about 60 nm to about 80 nm.

EXAMPLES

Objects and advantages of this disclosure are further illustrated by the following non-limiting examples. Particular materials and amounts thereof recited in these examples, as well as other conditions and details, are not intended to be limiting on this disclosure. Unless otherwise noted, all parts, percentages, ratios, etc. in the Examples and the rest of the specification are by weight.
Test Methods
Overlap Shear Strength Test
The adhesion of the compositions to e-coated steel was determined by measuring the overlap shear strength of bonded specimens. Substrate coupons measuring 25 mm×50.8 mm were wiped with a 1:1 (v:v) solution of isopropyl alcohol and water and were allowed to air-dry. Release liner was removed from one side of a 12.7 mm×25 mm portion of the adhesive composition and the composition was applied to one coupon. Unless otherwise specified, the second release liner was removed and the composition was exposed to a microwave source (H-bulb, HERAEUS NOBLELIGHT AMERICA, Gaithersburg, Md., 0.9-1.2 J/cm$^2$ UVA, as measured by a UVICURE Plus Integrating Radiometer (EIT, Inc., Sterling, Va.)) or 365 nm LED source (CLEARSTONE TECHNOLOGIES, Hopkins, Minn., 7.1 J/cm$^2$ UVA as measured by a Power Puck® II radiometer (EIT, Inc., Sterling, Va.)). A second coupon was applied to the irradiated sample thus closing the bond. Unless otherwise specified, the assembly was laminated by means of applying a static 6 kg load to the specimen for 30-60 s. Specimens were allowed to cure at ambient temperature and humidity for 24 hours prior to testing. A dynamic overlap shear test was performed at ambient temperature using an INSTRON Tensile Tester Model 5581 (INSTRON CORP., Canton, Mass.). Test specimens were loaded into the grips and the crosshead was operated at 2.5 mm per minute, loading the specimen to failure. Stress at break was recorded in units of MPa.
Cleavage Test
The adhesion of plastic material to glass was determined by measuring the cleavage strength of bonded specimens. Plastic test pieces, made of the specified material, measuring 22 mm×28 mm×4 mm, and tempered glass plaques, measuring 127 mm×50 mm×4 mm were wiped with a 1:1 (v:v) solution of isopropyl alcohol and water and were allowed to air-dry. A release liner was removed from a 22 mm×28 mm portion of the adhesive composition and this portion was applied to the plastic test piece. Unless otherwise specified, lamination was accomplished by means of applying a 1-3 kg weight to the test piece for 30 s. The second release liner was removed and the adhesive portion was exposed to a microwave source (H-bulb, HERAEUS NOBLELIGHT AMERICA, Gaithersburg, Md., 0.9-1.2 J/cm$^2$ UVA, as measured by a UVICURE Plus Integrating Radiometer (EIT, Inc., Sterling, Va.) or 365 nm LED source (CLEARSTONE TECHNOLOGIES, Hopkins, Minn., 7.1 J/cm$^2$ UVA as measured by a Power Puck® II radiometer (EIT, Inc., Sterling, Va.). The irradiated sample was applied to a tempered glass plaque and laminated by applying a 6 kg weight to the bonded assembly for 30-60 s. The assembly was allowed to cure 24 hours under ambient conditions prior to testing. Cured assemblies were mounted vertically (i.e., with the plane of the bond in a vertical orientation) in an INSTRON Tensile Tester Model 5565 (INSTRON CORP., Canton, Mass.). A 70 mm lever arm is attached to the plastic test piece, perpendicular to the plane of the bond and is pulled upwardly (parallel to the plane of the bond) at a rate of 2.5 mm per minute. The maximum value at break was recorded in N.
90° Peel Adhesion Test
Adhesive properties of the compositions were determined by measuring the 90° Peel adhesion. A stainless steel plate measuring 101 mm×127 mm was cleaned by wiping with a 1:1 (v:v) solution of isopropyl alcohol and water and was allowed to air-dry. Release liner was removed from one side of a 127 mm×12.7 mm portion of the adhesive composition and the composition was applied to the steel plate. The second release liner was removed and a 159 mm×16 mm strip of aluminum foil was placed over the adhesive with the anodized side in contact with the adhesive. The adhesive was laminated by means of a metal roller weighing 6.8 kg. After a dwell time of 20 minutes at ambient temperature, the 90° Peel Adhesion was measured using an INSTRON Tensile Tester Model 5565 (INSTRON CORP., Canton, Mass.) at a peel speed of 305 mm per minute. The average 90° Peel adhesion was recorded in units of N.
Tensile Pluck Test
The adhesion of plastic material to glass was determined by measuring the tensile strength of bonded specimens. Plastic test pieces, made of the specified material, measuring 22 mm×28 mm×4 mm, and tempered glass plaques, measuring 127 mm×50 mm×4 mm were wiped with a 1:1 (v:v) solution of isopropyl alcohol:water and were allowed to dry in air. Release liner was removed from a 22 mm×28 mm portion of the adhesive composition and this portion was applied to the plastic test piece. Lamination was accomplished by means of applying a 1-3 kg weight to the test piece for 30 s. Unless otherwise specified, the second release liner was removed and the adhesive portion was exposed to a microwave source (H-bulb, HERAEUS NOBLELIGHT AMERICA, Gaithersburg, Md., 0.9-1.2 J/cm$^2$ UVA, as measured by a UVICURE Plus Integrating Radiometer (EIT, Inc., Sterling, Va.)). Unless otherwise specified, the irradiated sample was applied to a tempered glass plaque and laminated by applying a 6 kg weight to the bonded assembly for 30-60 s. The assembly was allowed to cure 24 hours under ambient conditions prior to testing. Cured assemblies were mounted horizontally in an INSTRON Tensile Tester Model 5565 (INSTRON CORP., Canton, Mass.). A 70 mm arm is attached to the plastic test piece and is pulled upwardly (perpendicular to the plane of the bond) at a rate of 12.7 mm per minute. The load at break was recorded in N.

Parallel Torque Test

The Parallel Torque test is a test of how well a bracket or other hardware adheres to glass, and how much bond strength it has under parallel torque. A lever, such as a torque-wrench, with a fixture compatible with a test piece, is slowly turned in a plane parallel to the bonded area. Torque was recorded in N-m. Plastic test pieces, made of the specified material, measuring 22 mm×28 mm×4 mm, and frit-glass plaques, measuring 100 mm×100 mm×5 mm were wiped with a 1:1 (v:v) solution of isopropyl alcohol:water and were allowed to dry in air. A release liner was removed from a 22 mm×28 mm portion of the adhesive composition and this portion was applied to the plastic test piece. Lamination was accomplished by applying 138 kPa (20 psi) for 6 sec to the test piece and adhesive composition construction. Unless otherwise specified, the second release liner was removed and the composition was exposed to a microwave source (H-bulb, HERAEUS NOBLELIGHT AMERICA, Gaithersburg, Md., 0.9-1.2 J/cm$^2$ UVA, as measured by a UVICURE Plus Integrating Radiometer (EIT, Inc., Sterling, Va.)) or 365 nm LED source (CLEARSTONE TECHNOLOGIES, Hopkins, Minn., 7.1 J/cm$^2$ UVA as measured by a Power Puck® II radiometer (EIT, Inc., Sterling, Va.)). The irradiated sample was then applied to glass substrate to close the bond. The assembly was laminated by applying 207 kPa (30 psi) for 6 sec to the test piece, adhesive composition, and glass construction. Specimens were either cured under ambient conditions for 24 hours, or postbaked at the specified temperature for the specified period of time, followed by conditioning at ambient temperature and humidity for 24 hours prior to testing.

Vertical Torque Test

The Vertical Torque Test is a test of how well a bracket or other hardware adheres to glass, and how much bond strength it has under vertical torque. A lever, such as a torque-wrench, with a fixture compatible with a test piece, is slowly turned in a plane perpendicular to the bonded area while maintaining a downward pressure at the front of the button. The torque is recorded in N-m. The torque wrench has a maximum detection limit of 813 N-m. Plastic test pieces, made of the specified material, measuring 22 mm×28 mm×4 mm, and frit-glass plaques, measuring 100 mm×100 mm×5 mm were wiped with a 1:1 (v:v) solution of isopropyl alcohol and water and were allowed to air-dry. Release liner was removed from a 22 mm×28 mm portion of the adhesive composition and this portion was applied to the plastic test piece. Lamination was accomplished by applying 138 kPa (20 psi) for 6 sec to the test piece and adhesive composition construction. Unless otherwise specified, the second release liner was removed and the composition was exposed to a microwave source (H-bulb, HERAEUS NOBLELIGHT AMERICA, Gaithersburg, Md., 0.9-1.2 J/cm$^2$ UVA, as measured by a UVICURE Plus Integrating Radiometer (EIT, Inc., Sterling, Va.)) or 365 nm LED source (CLEARSTONE TECHNOLOGIES, Hopkins, Minn., 7.1 J/cm$^2$ UVA as measured by a Power Puck® II radiometer (EIT, Inc., Sterling, Va.)). The irradiated sample were then applied to glass substrate to close the bond. The assembly was laminated by applying 207 kPa (30 psi) for 6 sec to the test piece, adhesive composition, and glass construction. Specimens were either cured under ambient conditions for 24 hours, or postbaked at the specified temperature for the specified period of time, followed by conditioning at ambient temperature and humidity for 24 hours prior to testing.

Rheology Test

The glass transition temperature ($T_g$) of the acrylic copolymers was determined using an MCR 302 rheometer (ANTON PAAR GmbH, Graz, Austria) operating in oscillatory mode. Samples were loaded onto 8 mm parallel plates and a normal force of 0.1 N was applied. The sample was first cooled from 30° C. to −50° C. at 10° C. per minute while the strain ($\gamma$) was reduced from 1-0.01% and the normal force (FN) was increased from 0.1-0.5 N. The sample was then analyzed while heating from −50° C. to 150° C. at 10° C. per minute while $\gamma$ was increased from 0.01-5% and FN was reduced from 0.5-0.05 N. The oscillatory frequency (F) was 1 Hz in all experiments. The temperature coinciding with the primary peak in tan($\delta$) was recorded as the $T_g$, and is given in units of ° C.

Attenuated Total Reflectance (FTIR-ATR)

Attenuated total reflectance (ATR) measurements were made on a Nicolet Nexus 670 IR Spectrometer (THERMO FISHER SCIENTIFIC INC., Waltham, Mass.) with MCT/A detector and Smart OMNI single-bounce germanium (Ge) ATR accessory. Spectra consisted of thirty-two scans with a resolution of four (data spacing=2 cm$^{-1}$) over the range of 4000-650 cm$^{-1}$. ATR spectra were taken on samples both before ("Initial") and after ("Exposed") specified cure profiles (H-bulb, 70° C., 10 min; H-bulb, 24 hr, RT; 365 nm LED, 24 hr, RT; or 180° C., 30 min). For "H bulb, 70° C., 10 min" samples, the top liner was removed and the adhesive exposed to two passes at 10 meters/min (32 fpm) from a Fusion Light Hammer® 10 equipped with H bulb (HERAEUS NOBLELIGHT AMERICA; Gaithersburg, Md.). This corresponded to a total exposure of 1 UVA, 1 UVB, 0.25 UVC, 1.1 UVV (J/cm$^2$) as measured by a Power Puck® II radiometer (EIT, Inc., Sterling, Va.). The release liner was re-applied and the sample placed in a 70° C. oven for 10 min prior to ATR. "H-bulb, 24 hr, RT" samples received the same UV exposure as above, but were instead held at room temperature (approximately 21° C.) for 24 hours prior to ATR. For "365 nm LED, 24 hr, RT" samples, the top liner was removed and the adhesive exposed to one pass at 0.6 meters/min (2 fpm) from a 365 nm LED (CLEARSTONE TECHNOLOGIES, Hopkins, Minn.). This corresponded to a total exposure of 7.6 J/cm$^2$ (1.2 W/cm$^2$) as measured by a UViCure® Plus radiometer (EIT, Inc., Sterling, Va.). The release liner was re-applied and the sample held at room temperature (ca. 21° C.) for 24 hours prior to ATR. For each ATR measurement, the release liner was peeled from one side of the tape sample. The resulting adhesive surface was pressed down into good contact with the Ge crystal for the duration of the spectrum acquisition. Afterwards, the sample was peeled from the Ge crystal, the crystal cleaned with ethyl acetate, and a new background taken before the next measurement. The size of the 910 cm$^{-1}$ absorbance was monitored as an indicator of epoxy conversion, by comparing "Initial" vs. "Exposed" spectra of the same UVi-SBT composition. Samples were designated Uncured (U) if the 910 cm$^{-1}$ peak was unchanged, Partial Cure (P) if the peak was diminished but still visible, or Cured (C) if no discernible peak remained. Spectra for both faces (front and back) of exposed UVi-SBTs were obtained and analyzed, where 'front' was the directly-irradiated side and 'back' was the side indirectly exposed through the thickness of the tape. Results are reported in Tables 2, 4 & 6 below.

Creep Test

The creep performance and dimensional stability of compositions was determined using an MCR 302 rheometer (ANTON PAAR GmbH, Graz, Austria). A 0.6 mm thick sample of each composition was loaded between 25 mm parallel plates and a normal force (FN) of 1 N was applied. A constant stress of 1000 Pa was applied for 300 s, then a constant stress of 0 Pa was applied for 600 s. The strain at 300 s ($\gamma_{300s}$) was recorded to characterize the creep behavior, or cold-flow of the composition and is given in % strain.

Windshield Adhesion Test

The windshield adhesion test is a measure of how well and adhesive composition adheres to a laminated or tempered glass assembly. A portion of laminated vehicular glass and a 20 mm aluminum dolly were cleaned prior to bonding by wiping with a 1:1 (v:v) solution of isopropyl alcohol and water and were allowed to air-dry. A portion of the adhesive composition was cut to the size of the dolly. The release liner was removed from one side and the sample was applied to the dolly. The second release liner was removed and the specimen was exposed using a 365 nm LED (7.6 J/cm$^2$ UVA, CLEARSTONE TECHNOLOGIES, Hopkins, Minn., as measured by an EIT UV Power Puck II, EIT, Sterling, Va.). The adhesive and dolly construct was applied to the laminated glass using hand-pressure. Test specimens were allowed to cure at ambient temperature and humidity and were then tested by the following method at the specified time interval.

The bond strength was determined with a PosiTest AT-A adhesion tester (DeFelsko Corp., Ogdensburg, N.Y.) according to ASTM D 4541 "Standard Test Method for Pull-Off Strength of Coatings Using Portable Adhesion Testers." The bond strength was tested with a pressure rate of 0.2 MPa/s, and value recorded in MPa at bond failure.

Materials

| | |
|---|---|
| ARCOL LHT 240 | Polyether polyol obtained from Bayer MaterialScience LLC. |
| EPON 1001F | Solid epoxy resin comprised of diglycidyether of bisphenol A obtained from Momentive Specialty Chemicals, Inc. |
| EPON 828 | Liquid epoxy resin comprised of diglycidyether of bisphenol A obtained from Momentive Specialty Chemicals, Inc. |
| EPONEX 1510 | Liquid epoxy resin comprised of diglycidyether of hydrogenated bisphenol A obtained from Momentive Specialty Chemicals, Inc. |
| LEVAPREN 700HV | Ethylene-vinyl acetate copolymer obtained from Lanxess Corporation. |
| PHENOXY PKHA | Phenoxy resin obtained from InChem Corporation. |
| DYNACOLL S EP 1408 | Semi-crystalline polyester polyol obtained from Evonik. |
| DYNACOLL S 1426 | Amorphous polyester polyol obtained from Evonik. |
| UVI 6976 | Triaryl-sulfonium Hexafluoroantimonate, 50 wt % in propylene carbonate obtained from Aceto Pharma Corporation. |
| GPTMS | 3-(Glycidoxypropyl) Trimethoxysilane obtained from UCT, Inc., Bristol, PA. |
| 4-HBA | 4-Hydroxybutyl acrylate obtained from San Esters, New York City, NY. |
| PAG210S | Triarylsulfonium salt with proprietary phosphate anion obtained from San-Apro Ltd., Tokyo, Japan. |
| Propylene carbonate (PC) | Solvent obtained from Sigma-Aldrich, St. Louis, MO. |
| Methyl acrylate (MA) | Monomer obtained from Florham Park, NJ. |
| 1,4-Cyclohexanedimethanol | Polyol obtained from Sigma-Aldrich. |
| 1,6-Hexanediol | Diol obtained from Sigma-Aldrich. |
| Butyl acrylate (BA) | Monomer obtained from BASF. |
| Glycidyl methacrylate (GMA) | Monomer obtained from Dow Chemical Company. |
| IRGACURE 651 | Benzyldimethyl ketal photoinitiator obtained from BASF. |
| Iso-octyl thioglycolate (IOTG) | Obtained from Evans Chemetics LP, Teaneck, NJ. |
| Phenoxyethyl acrylate (2-POEA) | Phenoxyethyl acrylate (Viscoat #192) obtained from San Esters. |
| Isobornyl acrylate (IBOA) | Isobornyl acrylate (IBXA) obtained from San Esters. |
| Tetrahydrofurfuryl acrylate (THFa) | Tetrahydrofurfuryl acrylate (V-150) obtained from San Esters. |
| CRASTIN test pieces | 30% glass-reinforced polybutylene terephthalate (PBT), obtained from DuPont, Wilmington, DE, under the trade designation "LW9030 BK851." |
| GRIVORY test pieces | 50% glass-fibre reinforced copolyamide thermoplastic material obtained from EMS-Grivory, Sumter, SC. |
| Tempered glass | Clear tempered glass obtained from Industrial Glass Products, Los Angeles, CA. |
| Frit glass | Tempered glass plaques coated with Ferro 24-8537 frit obtained from AGC Automotive, Americas, Ypsilanti, MI. |
| Laminated vehicular glass | Carlite (R) laminated glass coated with Johnson Matthey 2L5350 UV695 frit obtained from Carlex Glass Co., Nashville, TN. |
| Aluminum oxide | Eckart Aluminum 120 Atomized powder obtained from Eckart America Corporation, Painesville, OH. |
| E-coated steel panel | Cold-rolled steel (C710 C20 DTW unpolished) with ED-5050B coating, ACT Laboratories Inc., Hillsdale, MI. |

Examples 1-3

Epoxy-EVA-based curable adhesive compositions (shown in Table 1) were prepared using a BRABENDER mixer (C.W. BRABENDER, Hackensack, N.J.) equipped with a 50 or 250 g capacity heated mix head and kneading elements. The mixer was operated at the desired mixing temperature of 120-150° C. and the kneading elements were operated at 100 rpm. The LEVAPREN was added to the mixer and allowed to mix for several minutes. The solid epoxy resin and phenoxy resin were then added and allowed to mix until the resins were uniformly distributed through the mixture. The liquid epoxy resin, polyol, and silane materials were added slowly until they were uniformly distributed. The resulting mixture was allowed to stir for several minutes then the photoacid generator was added drop-wise. The mixture was allowed to stir several minutes and was then transferred to an aluminum pan and allowed to cool. The mixture of material was placed between two release liners and was pressed, with heating to 95° C., into 0.6 mm thick film by means of a hydraulic press (CARVER INC., Wabash, Ind.).

TABLE 1

(all numbers in wt %)

| Material | Example 1 | Example 2 | Example 3 |
|---|---|---|---|
| EPON 828 | 30 | 27 | 32 |
| EPON 1001F | 30 | 22 | 11 |
| ARCOL 240 LHT | 10 | 10 | |
| GPTMS | 1 | | |
| LEVAPREN 700HV | 30 | 30 | 42 |
| PHENOXY PKHA | | 10 | |
| UVI 6976 | 0.5 | 1 | 1 |
| Aluminum oxide | | | 15 |

Test specimens were prepared for evaluation of overlap shear, cleavage and tensile pluck performance of the cured epoxy-EVA-based compositions. Test specimens were cured by applying a portion of the composition to one substrate, irradiating with either a microwave or LED source, closing the bond, and allowing the specimen to cure as specified. Cleavage and tensile pluck specimens were prepared using CRASTIN test pieces and tempered glass. FTIR-ATR was used to determine the extent of cure on both faces. The similarity of the uncured compositions to those of a pressure sensitive adhesive was determined by measuring the 90° peel adhesion and creep behavior. Results are reported in Table 2 below.

TABLE 2

| Test Method | Example 1 | Example 2 | Example 3 |
|---|---|---|---|
| Overlap Shear (MPa) | | | |
| H-bulb, 24 hr, RT | 8.3 | 12.3 | 0.4 |
| 365 nm LED, 24 hr, RT | 10.6 | 17.2 | 0.3 |
| Cleavage (N) | | | |
| H-bulb, 24 hr, RT | 191 | 51 | 27 |
| 365 nm LED, 24 hr, RT | 85 | 59 | 20 |
| FTIR-ATR | | | |
| H-bulb, 70° C., 10 min | C/C | C/C | C/U |
| H-bulb, 24 hr, RT | P/P | P/P | C/U |
| 365 nm LED, 24 hr, RT | P/P | C/C | C/U |
| 90 deg peel (N) | 24 | 31 | 22 |
| Creep (% strain) | 92 | 37 | 48 |
| Tensile Pluck (N) | | | |
| H-bulb, 24 hr, 25° C. | 693 | 324 | — |
| H-bulb, 24 hr, 70° C. | 644 | 671 | — |

Examples 4-7

Epoxy-polyester-based curable adhesive compositions (shown in Table 3) were prepared using a BRABENDER mixer (C.W. Brabender, Hackensack, N.J.) equipped with a 50 or 250 g capacity heated mix head and kneading elements. The mixer was operated at the desired mixing temperature of 120-150° C. and the kneading elements were operated at 100 rpm. The polyester resin was added and allowed to mix for several minutes. The solid epoxy resin and phenoxy resin were added and allowed to mix until the resins were uniformly distributed through the mixture. The liquid epoxy resin and polyol were added slowly until uniformly distributed. The resulting mixture was allowed to stir for several minutes then the photoacid generator was added drop-wise. The mixture was allowed to stir for several minutes and was then transferred to an aluminum pan and allowed to cool. The material mixture was placed between two release liners and was pressed, with heating to 95° C., into 0.6 mm thick film by means of a hydraulic press (Carver Inc., Wabash, Ind.).

TABLE 3

(all numbers in wt%)

| Material | Example 4 | Example 5 | Example 6 | Example 7 |
|---|---|---|---|---|
| EPON 828 | 27 | 15 | 15 | 27 |
| EPON 1001F | 22 | 29 | 29 | 22 |
| ARCOL 240 LHT | 10 | 15 | 15 | 10 |
| DYNACOLL S 1426 | 30 | 40 | | |
| DYNACOLL S EP 1408 | | | 40 | 30 |
| PHENOXY PKHA | 10 | | | 10 |
| UVI 6976 | 1 | 1 | 1 | 1 |

Test specimens were prepared for evaluation of the overlap shear, cleavage and tensile pluck performance of the cured epoxy-polyester-based compositions. Test specimens were cured by applying a portion of the composition to one substrate, irradiating with either a microwave or LED source, closing the bond, and allowing the specimen to cure as specified. Cleavage and tensile pluck specimens were prepared using CRASTIN test pieces and tempered glass. FTIR-ATR was used to determine the extent of cure on both faces. The adhesive properties of uncured compositions Examples 4-7 were determined by measuring the 90° peel adhesion and creep behavior. Results are reported in Table 4 below.

TABLE 4

| Test Method | Example 4 | Example 5 | Example 6 | Example 7 |
|---|---|---|---|---|
| Overlap Shear (MPa) | | | | |
| H-bulb, 24 hr, RT | 1.3 | 2.1 | 1.0 | 3.1 |
| 365 nm LED, 24 hr, RT | 1.2 | 0.4 | 11.6 | 21.5 |
| Cleavage (N) | | | | |
| H-bulb, 24 hr, RT | 55 | 33 | 44 | 53 |
| 365 nm LED, 24 hr, RT | 24 | 22 | 90 | 50 |
| FTIR-ATR | | | | |
| H-bulb, 70° C., 10 min | C/P | C/P | C/P | C/P |
| H-bulb, 24 hr, RT | P/U | P/P | C/P | C/P |
| 365 nm LED, 24 hr, RT | P/P | C/C | C/C | C/C |
| 90° peel (N) | 36 | 13 | 2 | 7 |
| Creep (% strain) | 22 | 16 | 1298 | 275 |
| Tensile Pluck (N) | | | | |
| H-bulb, 24 hr, 25° C. | — | — | — | 307 |
| H-bulb, 24 hr, 70° C. | — | — | — | 142 |

Preparatory Acrylic Mixtures P1-P2

Acrylic mixtures as shown in Table 5 below were prepared for use in Examples 8-9. The mixtures were prepared as generally taught in U.S. Pat. No. 5,721,289 (Karim et. al.). For each composition, all acrylic monomers and 0.04 parts IRGACURE 651 photoinitiator were mixed in a glass jar. For P1 only, 29 parts EPON 828 and 10 parts EPON 1001F were additionally added. The solutions were purged with nitrogen and exposed to UVA light with stirring until the viscosity of the mixture was suitable for coating (500-5000 cP). A mixture of 100 parts of the above syrup, 0.2 parts IRGACURE 651, and any remaining components (epoxies and/or alcohols) was made. The mixture was coated at 0.75 mm thickness between two 0.050 mm silicone-coated poly(ethylene terephthalate) release liners. This construct was irradiated from each side with 1200 mJ/cm² UVA from 350BL fluorescent bulbs, as measured by a UVIRAD® Low Energy UV Integrating Radiometer (EIT, Inc., Sterling, Va.). Release liners were removed prior to subsequent compounding.

Preparatory Acrylic Mixtures P3-P7

Acrylic mixtures as shown in Table 5 below were prepared for use in Examples 10-21. The mixtures were prepared as generally taught in U.S. Pat. No. 5,804,610 (Hamer et al.). Solutions were prepared by combining the acrylic monomers, radical photoinitiator (IRGACURE 651) and chain-transfer agent (IOTG) in an amber glass jar and swirling by hand to mix. The solution was divided into 25 g aliquots within heat sealed compartments of an ethylene vinyl acetate-based film, immersed in a 16° C. water bath, and polymerized using UV light (UVA=4.7 mW cm⁻², 8 minutes per side).

TABLE 5

(all numbers in wt %)

| Material | P1 | P2 | P3 | P4 | P5 | P6 | P7 |
|---|---|---|---|---|---|---|---|
| 2-POEA | 43 | | | | | | |
| IBOA | 14 | | | | | | |
| BA | | 35 | 49 | 49 | 50 | 70 | 75 |
| THFa | | 23 | 49 | 49 | 50 | | 23 |
| MA | | | | | | 20 | |
| GMA | | | 2 | | | 10 | 2 |
| HBA | | | | 2 | | | |
| EPON 828 | 29 | 31 | | | | | |
| EPON 1001F | 10 | 8 | | | | | |
| Cyclohexane dimethanol | 2 | 4 | | | | | |
| 1,6-hexanediol | 2 | | | | | | |
| IRGACURE 651 | 0.24 | 0.24 | 0.2 | 0.2 | 0.2 | 0.2 | 0.2 |
| IOTG | | | 0.1 | 0.1 | 0.1 | 0.1 | 0.1 |

Examples 8-20

The acrylic mixtures P1-P7 were further processed to yield the epoxy-acrylic-based compositions listed in Table 6 below. Compositions were prepared using a BRABENDER mixer (C.W. Brabender, Hackensack, N.J.) equipped with a 50 or 250 g capacity heated mix head and kneading elements. The mixer was operated at the desired mixing temperature of 120-150° C. and the kneading elements were operated at 100 rpm. The acrylic copolymer was added and allowed to mix for several minutes. The solid epoxy resin and phenoxy resin were added and allowed to mix until uniformly distributed through the mixture. The liquid epoxy resin and polyol were then added slowly until uniformly distributed. The resulting mixture was allowed to stir for several minutes and then the photoacid generator was added drop-wise. The mixture was allowed to stir several minutes and was then transferred to an aluminum pan and allowed to cool. The mixture was then placed between two release liners and was pressed, with heating to 95° C., into 0.6 mm thick film by means of a hydraulic press (Carver Inc., Wabash, Ind.).

TABLE 6

(all numbers in wt %)

| Material | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|---|
| Acrylic mixture (wt %) | P1 97 | P2 97 | P3 64 | P3 48 | P3 32 | P3 34 | P3 34 | P3 38 | P3 32 | P4 32 | P5 32 | P6 32 | P7 32 |
| EPONEX 1510 | — | — | 10 | 14 | 19 | 21 | 21 | 24 | 19 | 19 | 19 | 19 | 19 |
| EPON 1001F | — | — | 10 | 14 | 19 | 21 | 21 | 24 | 19 | 19 | 19 | 19 | 19 |
| ARCOL 240 LHT | — | — | 5 | 7 | 10 | 11 | 11 | 12 | 10 | 10 | 10 | 10 | 10 |
| GPTMS | — | — | 1 | 1 | 1 | 1 | 1 | 1 | 1 | 1 | 1 | 1 | 1 |
| LEVAPREN 700HV | — | — | 5 | 7 | 10 | 11 | — | — | 10 | 10 | 10 | 10 | 10 |
| PHENOXY PKHA | — | — | 5 | 7 | 10 | — | 11 | — | 10 | 10 | 10 | 10 | 10 |
| UVI 6976 | 2.9 | 2.8 | 0.5 | 0.5 | 0.5 | 0.5 | 0.5 | 0.5 | | 0.5 | 0.5 | 0.5 | 0.5 |
| PAG210S | — | — | — | — | — | — | — | — | 0.5 | — | — | — | — |

The $T_g$ of the acrylic polymer was measured prior to compounding. Test specimens were prepared for evaluation of the overlap shear, cleavage and tensile pluck performance of the cured epoxy-acrylic-based compositions. Test specimens were cured by applying a portion of the composition to one substrate, irradiating with either a microwave or LED source, closing the bond, and allowing the specimen to cure as specified. Cleavage and tensile pluck specimens were prepared using CRASTIN test pieces and tempered glass. FTIR-ATR was used to determine the extent of cure on both faces. The adhesive properties of the uncured compositions was determined by measuring the 90° peel adhesion and creep behavior. Measured properties are shown in Table 7 below.

Examples 21-28

The parallel torque, vertical torque, and tensile pluck properties of the adhesive composition of Example 12, as related to UV exposure, were evaluated and the results are shown in Table 8 below. Specimens were prepared using GRIVORY test pieces and frit glass according to the general test methods above. For Examples 21-24 only, the plastic test piece was wiped with a lint-free tissue paper saturated with a primer, UVI-6976, applied after wiping the plastic test piece with isopropyl alcohol/water but before applying the adhesive composition. All specimens were exposed to UVA from a 365 nm LED (7.5 J/cm², CLEARSTONE TECHNOLOGIES, Hopkins, Minn.), were post-baked at 150° C. for 5 minutes and were then conditioned at ambient temperature and humidity for 24 hours prior to mechanical testing.

J/cm² UVA from a 365 nm LED (CLEARSTONE TECHNOLOGIES, Hopkins, Minn.). Upon completion of the post-bake, samples were conditioned at ambient temperature

TABLE 7

| Test Method | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|---|
| Overlap Shear (MPa) H-bulb, 24 h, RT | 0.3 | 1.0 | 2.6 | 5.0 | 6.5 | 8.9 | 11.5 | 10.0 | 6.2 | 6.9 | 8.5 | 0.4 | 1.5 |
| 365 nm LED, 24 h, RT | — | — | — | — | 6.4 | — | — | — | — | — | — | — | — |
| Cleavage (N) H-bulb, 24 h, RT | 71 | 12 | 42 | 128 | 161 | 123 | 45 | 125 | 156 | 126 | 151 | 20 | 48 |
| 365 nm LED, 24 h, RT | — | — | — | — | 139 | — | — | — | — | — | — | — | — |
| FTIR-ATR H-bulb, 70° C., 10 min | C/C | C/C | — | — | C/C | — | — | — | C/C | C/C | C/C | C/C | C/C |
| H-bulb, 24 h, RT | C/C | C/C | — | — | C/C | — | — | — | C/C | C/C | C/C | C/C | C/C |
| 365 nm LED, 24 h, RT | — | — | — | — | C/C | — | — | — | — | — | C/C | — | — |
| 90 deg peel (N) | 15 | 24 | 54 | 54 | 64 | 25 | 37 | — | — | — | 44 | — | — |
| Creep (% strain) | 55 | 623 | 118 | 162 | 167 | 474 | 482 | 1250 | — | — | 176 | — | — |
| Acrylic $T_g$ (° C.) | — | — | −23 | −23 | −23 | −23 | −23 | — | −23 | −24 | −24 | −23 | −33 |
| Appearance | — | — | — | — | T | — | — | — | T | T | T | 0 | 0 |
| H-bulb, 70° C., 10 min Tensile Pluck (N) H-bulb, 24 hr, 25° C. | — | — | — | — | — | 1116 | — | — | — | — | — | 1271 | — |
| H-bulb, 24 hr, 70° C. | — | — | — | — | — | 236 | — | — | — | — | — | 262 | — |

TABLE 8

| Example | UVA energy (J/cm²) | Parallel torque (N-m) | Vertical torque (N-m) | Tensile Pluck (N) |
|---|---|---|---|---|
| 21 | 3 | 23 | 610 | 1179 |
| 22 | 7 | 22 | 678 | 237 |
| 23 | 13 | 29 | 700 | 585 |
| 24 | 25 | 0 | 0 | 0 |
| 25 | 3 | 14 | 813 | 451 |
| 26 | 7 | 25 | 813 | 513 |
| 27 | 13 | 29 | 813 | 531 |
| 28 | 25 | 25 | 813 | 1129 |

Examples 29-48

The parallel torque properties of the adhesive composition of Example 12, as related to post-bake condition, were evaluated and results are shown in Table 9 below. Parallel torque specimens were prepared according to the general test methods above using the specified plastic test piece, glass substrate, and post-bake time and temperature listed in Table 9. Samples in Examples 29-34 were exposed to 7.5 and humidity for 24 hours prior to testing. Parallel torque values are reported in Table 9 and are given in units of N-m.

Examples 49-53

FTIR-ATR was used to compare the curing properties of the adhesive composition of Example 12 upon exposure to radiation of different principal wavelengths. LEDs with principle wavelengths of 365 nm or 395 nm were used to initiate the curing reaction of the adhesive composition. A portion of the composition, with one liner removed, was placed in an aluminum pan and was exposed to the specified light source for the specified

TABLE 9

| Example | Test Substrates | Bake temperature (° C.) | Bake time (10 min) | Bake time (5 min) |
|---|---|---|---|---|
| 29 | CRASTIN/Frit glass | 70 | 10 | — |
| 30 | CRASTIN/Frit glass | 90 | 12 | — |
| 31 | CRASTIN/Frit glass | 110 | 21 | 16 |
| 32 | CRASTIN/Frit glass | 130 | — | 15 |

TABLE 9-continued

| Example | Test Substrates | Bake temperature (° C.) | Bake time (10 min) | Bake time (5 min) |
|---|---|---|---|---|
| 33 | CRASTIN/Frit glass | 150 | — | 17 |
| 34 | CRASTIN/tempered glass | 70 | 8 | — |
| 35 | CRASTIN/tempered glass | 90 | 9 | — |
| 36 | CRASTIN/tempered glass | 110 | 7 | 8 |
| 37 | CRASTIN/tempered glass | 130 | — | 7 |
| 38 | CRASTIN/tempered glass | 150 | — | 7 |
| 39 | GRIVORY/Frit glass | 70 | 18 | — |
| 40 | GRIVORY/Frit glass | 90 | 40 | — |
| 41 | GRIVORY/Frit glass | 110 | 38 | 37 |
| 42 | GRIVORY/Frit glass | 130 | — | 30 |
| 43 | GRIVORY/Frit glass | 150 | — | 33 |
| 44 | GRIVORY/tempered glass | 70 | 15 | — |
| 45 | GRIVORY/tempered glass | 90 | 13 | — |
| 46 | GRIVORY/tempered glass | 110 | 11 | 13 |
| 47 | GRIVORY/tempered glass | 130 | — | 11 |
| 48 | GRIVORY/tempered glass | 150 | — | 8 | duration. FTIR-ATR was then used to measure the cure upon exposure to UV radiation. Qualitative epoxy conversion data appear in Table 10. The epoxy conversion was assessed according to the general Attenuated Total Reflectance method. Upon 4 seconds exposure to the 365 nm LED, the composition showed good conversion of epoxy as shown by the disappearance of the 912 cm$^{-1}$ peak in the FTIR-ATR spectra. Yet, upon 24 seconds exposure to the 395 nm LED, there is still presence of an epoxy peak at 912 cm$^{-1}$.

TABLE 10

| Example | LED used (nm) | Exposure time (sec) | Epoxy conversion |
|---|---|---|---|
| 49 | 365 | 1.2 | P/P |
| 50 | 365 | 4 | P/C |
| 51 | 365 | 8 | C/C |
| 52 | 395 | 0.8 | U/U |
| 53 | 395 | 24 | U/U |

Examples 54-57

The parallel torque and vertical torque properties of the adhesive composition of Example 12, as related to radiation source and total exposure energy, were evaluated. Specimens were prepared using GRIVORY test pieces and frit glass according to the general methods described above using the specified radiation source and exposure energy. Specimens were post-baked at 150° C. for 5 minutes and were then conditioned at ambient temperature and humidity for 24 hours prior to mechanical testing. The parallel torque and vertical torque results are shown in Table 11 below.

TABLE 11

| Example | H Bulb UVA energy (J/cm$^2$) | 365 nm LED UVA energy (J/cm$^2$) | Parallel torque (N-m) | Vertical torque (N-m) |
|---|---|---|---|---|
| 54 | 0.8 | — | 16 | 576 |
| 55 | 1.4 | — | 23 | 780 |
| 56 | — | 7 | 25 | 813 |
| 57 | — | 13 | 29 | 813 |

Examples 58-62

The parallel torque, vertical torque, tensile pluck, and cleavage properties of the adhesive composition of Example 12, as related to exposure energy from a 365 nm LED, were evaluated. Specimens were prepared using GRIVORY test pieces and frit glass according to the general methods above using the specified exposure energy. The tensile pluck and cleavage samples were laminated to the plastic test specimen using 138 kPa (20 psi) for 6 seconds and were laminated to the glass substrate upon activation using 207 kPa (30 psi) for 6 seconds. All specimens were post-baked at 150° C. for 5 minutes and were then conditioned at ambient temperature and humidity for 24 hours prior to mechanical testing. Parallel torque, vertical torque, tensile pluck, and cleavage results are shown in Table 12 below. It is noted that Examples 59-62 are the same as Examples 25-28 in Table 8, and are merely included in this table for comparison purposes.

TABLE 12

| Example | UV dosage (J/cm$^2$) | Parallel torque (N-m) | Vertical torque (N-m) | Tensile pluck (N) | Cleavage (N) |
|---|---|---|---|---|---|
| 58 | 1 | 11 | 705 | 246 | 89 |
| 59 | 3 | 14 | 813 | 451 | 187 |
| 60 | 7 | 25 | 813 | 513 | 144 |
| 61 | 13 | 29 | 813 | 531 | 116 |
| 62 | 25 | 25 | 813 | 1129 | 142 |

Examples 63-65

The overlap shear properties of the adhesive composition of Example 12, as related to film thickness and radiation source, were evaluated. Overlap shear specimens of the specified film thickness were prepared according to the general methods above using the specified radiation source. All samples were laminated at a pressure of 207 kPa (30 psi) for 6 seconds. An exposure energy of 1.4 J/cm$^2$ was measured for specimens irradiated with the H-Bulb source. An exposure energy of 7.6 J/cm$^2$ was measured for specimens irradiated with the 365 nm LED source. An EIT UV Power Puck II designated to measure UVA radiation in the range of 315-400 nm was used to measure the exposure energy. Specimens were allowed to cure at ambient temperature and humidity for 24 hours prior to mechanical testing. The overlap shear test results are reported in Table 13 below.

TABLE 13

| Example | Thickness (microns) | Overlap shear strength (H bulb, MPa) | Overlap shear strength (365 nm LED, MPa) |
|---|---|---|---|
| 63 | 635 | 17.2 | 16.7 |
| 64 | 1270 | 4.4 | 12.8 |
| 65 | 1905 | 1.2 | 13.5 |

Examples 66-68

The bond strength of the adhesive composition of Example 12 on laminated vehicular glass was evaluated according the Windshield Adhesion Test. Results appear in Table 14 below.

| Example | Curing Time | Bond strength (MPa) |
|---------|-------------|---------------------|
| 66 | 10 min | 0.3 |
| 67 | 2 hours | 6.1 |
| 68 | 24 hours | 8.2 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of bonding two substrates together, said method comprising:
   providing the two substrates;
   disposing an adhesive layer on a bonding surface of either of the substrates, the adhesive layer comprising an ultraviolet radiation curable composition that is dimensionally stable at ambient conditions;
   either before or after disposing the adhesive layer on the bonding surface, irradiating the adhesive layer with ultraviolet radiation from an ultraviolet radiation source to form an irradiated adhesive layer and cause curing of the curable composition;
   placing one substrate so as to be bonded to the other substrate by the irradiated adhesive layer; and
   after said placing, allowing the irradiated adhesive layer to cure as a result of said irradiating,
   wherein the curable composition comprises a photoinitiator, the photoinitiator has an ultraviolet absorption curve characterized by a highest wavelength absorption peak measured at a concentration of about 0.03 wt % in acetonitrile solution, and the ultraviolet radiation has a spectral power distribution offset from the wavelength of the highest wavelength absorption peak.

2. The method of claim 1, wherein the ultraviolet radiation source exhibits a spectral power distribution having a wavelength distribution confined within a 50 nm range or less.

3. The method of claim 2, wherein the spectral power distribution substantially excludes wavelengths below about 280 nm.

4. The method of claim 3, wherein the highest wavelength absorption peak is located at a wavelength of at most about 395 nm.

5. The method of claim 4, wherein the spectral power distribution has a peak intensity at a wavelength in the range of from about 315 nm to about 400 nm.

6. The method of claim 5, wherein the difference in wavelength between the highest wavelength absorption peak of the photoinitiator and the peak intensity of the ultraviolet radiation source is in the range of from about 30 nm to about 110 nm.

7. The method of claim 2, wherein the difference in wavelength between the highest wavelength absorption peak of the photoinitiator and the peak intensity of the ultraviolet radiation source is in the range of from about 60 nm to about 80 nm.

8. The method of claim 1, wherein the curable composition comprises:
   a) in the range of from about 25 to about 80 parts by weight of one or more epoxy resins;
   b) in the range of from about 5 to about 30 parts by weight of one or more liquid polyether polyols;
   c) in the range of from about 10 to about 50 parts by weight of one or more hydroxyl-functional film-forming polymers or precursors thereof, wherein the sum of a) to c) is 100 parts by weight; and
   d) in the range of from about 0.1 to about 5 parts by weight of a photoinitiator, relative to the 100 parts of a) to c).

9. The method of claim 8, wherein the one or more hydroxy-functional film forming polymers are selected from phenoxy resins, ethylene-vinyl acetate copolymers, polycaprolactone polyols, polyester polyols, and polyvinyl acetal resins.

10. The method of claim 1, wherein either (a) the ultraviolet radiation source produces ultraviolet radiation having a spectral power distribution characterized by a narrow wavelength distribution within a 50 nm range or less, (b) the spectral power distribution substantially excludes wavelengths below about 280 nm, (c) the highest wavelength absorption peak is located at a wavelength of at most about 395 nm, (d) the spectral power distribution has a peak intensity at a wavelength in the range of from about 315 nm to about 400 nm, (e) the difference in wavelength between the highest wavelength absorption peak of the photoinitiator and the peak intensity of the ultraviolet radiation source is in the range of from 30 nm to 110 nm, or (f) any combination of (a) to (e).

11. The method of claim 1, wherein the highest wavelength absorption peak is located at a wavelength of at most about 395 nm.

12. The method of claim 1, wherein the adhesive layer has a thickness, and the ultraviolet radiation is provided by a monochromatic ultraviolet radiation source that activates through the entire thickness of the adhesive layer.

13. The method of claim 1, wherein the curable composition comprises a photoinitiator, the adhesive layer comprises an epoxy component that is ultraviolet radiation curable, and the photoinitiator is a photoacid generator.

14. The method of claim 1, wherein the bonding surface of at least one substrate is glass.

15. A method of bonding two substrates together, said method comprising:
   disposing an adhesive layer on a bonding surface of either of the substrates, the adhesive layer comprising an ultraviolet radiation curable composition comprised of:
   a) in the range of from about 25 to about 80 parts by weight of one or more epoxy resins;
   b) in the range of from about 5 to about 30 parts by weight of one or more liquid polyether polyols;
   c) in the range of from about 10 to about 50 parts by weight of one or more hydroxyl-functional film-forming polymers and precursors thereof, wherein the sum of a) to c) is 100 parts per weight; and
   d) in the range of from about 0.1 to about 5 parts by weight of a photoinitiator, relative to the 100 parts of a) to c);
   either before or after disposing the adhesive layer on the bonding surface, irradiating the adhesive layer with ultraviolet radiation to cause curing of the curable composition;
   placing one substrate so as to be bonded to the other substrate by the adhesive layer; and
   allowing the adhesive layer to cure,
   wherein the photoinitiator has an ultraviolet absorption curve characterized by a highest wavelength absorption peak measured at a concentration of about 0.03 wt % in acetonitrile solution and wherein the ultraviolet radiation has a spectral power distribution offset from the wavelength of the highest wavelength absorption peak.

16. A method of bonding two substrates together, said method comprising:
disposing an adhesive layer on a bonding surface of either of the substrates, the adhesive layer comprising an ultraviolet radiation curable composition comprised of:
   a) in the range of from about 15 to about 50 parts by weight of a semi-crystalline polyester resin;
   b) in the range of from about 20 to about 75 parts by weight of one or more epoxy resins;
   c) in the range of from about 5 to about 15 parts by weight of one or more liquid polyether polyols;
   d) in the range of from about 5 to about 20 parts by weight of one or more hydroxyl-functional film-forming polymers and precursors thereof, wherein the sum of a) to d) is 100 parts by weight; and
   e) in the range of from about 0.1 to about 5 parts by weight of a photoinitiator, relative to the 100 parts of a) to d);
either before or after disposing the adhesive layer on the bonding surface, irradiating the adhesive layer with ultraviolet radiation to cause curing of the curable composition, wherein the photoinitiator has an ultraviolet absorption curve characterized by a highest wavelength absorption peak measured at a concentration of about 0.03 wt % in acetonitrile solution and wherein the ultraviolet radiation has a spectral power distribution offset from the wavelength of the highest wavelength absorption peak;
placing one of the substrates so as to be bonded to the other substrate by the adhesive layer; and
allowing the adhesive layer to cure.

17. A method of bonding two substrates together, said method comprising:
disposing an adhesive layer on a bonding surface of either of the substrates, the adhesive layer comprising an ultraviolet radiation curable composition having an ultraviolet absorption curve characterized by a highest wavelength absorption peak measured at a concentration of about 0.03 wt % in acetonitrile solution;
either before or after disposing the adhesive layer on the bonding surface, irradiating the adhesive layer with ultraviolet radiation to cause curing of the curable composition, wherein the ultraviolet radiation has a spectral power distribution offset from the wavelength of the highest wavelength absorption peak;
placing one of the substrates so as to be bonded to the other substrate by the adhesive layer; and
allowing the adhesive layer to cure.

* * * * *